(12) United States Patent
Nagasawa

(10) Patent No.: US 7,663,709 B2
(45) Date of Patent: Feb. 16, 2010

(54) ELECTRO-OPTICAL DEVICE, MANUFACTURING METHOD THEREOF, AND ELECTRONIC APPARATUS

(75) Inventor: Hitoya Nagasawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 651 days.

(21) Appl. No.: 11/613,572

(22) Filed: Dec. 20, 2006

(65) Prior Publication Data
US 2007/0159570 A1   Jul. 12, 2007

(30) Foreign Application Priority Data

Jan. 12, 2006  (JP)  ............... 2006-004530
Oct. 20, 2006  (JP)  ............... 2006-286027

(51) Int. Cl.
*G02F 1/1343* (2006.01)
(52) U.S. Cl. ..................................... 349/39
(58) Field of Classification Search ............. 349/39, 349/152
See application file for complete search history.

(56) References Cited

U.S. PATENT DOCUMENTS 5,796,448 A * 8/1998 Kim ........................ 349/39
5,859,677 A * 1/1999 Watanabe et al. ........... 349/38
5,966,190 A * 10/1999 Dohjo et al. ............... 349/39
6,542,205 B2 * 4/2003 Ohtani et al. ............... 349/47

FOREIGN PATENT DOCUMENTS

JP    B2 3173200    6/2001

* cited by examiner

*Primary Examiner*—James A Dudek
(74) *Attorney, Agent, or Firm*—Oliff & Berridge, PLC

(57) ABSTRACT

An electro-optical device includes a plurality of pixel electrodes, storage capacitors which are provided below the plurality of pixel electrodes with an inter-layer insulating layer disposed therebetween and in which a lower electrode, a dielectric film, and an upper electrode are sequentially laminated, an extending section extending from the dielectric film, a first conductive film disposed above the extending section of the dielectric film, a second conductive film disposed below the extending section of the dielectric film, and a relay layer disposed above the first conductive film, formed of the same film as the plurality of the pixel electrodes, and electrically connecting the first conductive film to the second conductive film, wherein the plurality of pixel electrodes and the storage capacitors are provided in a pixel area on a substrate, and the extending section, the first conductive film, the second conductive film, and the relay layer are disposed in a peripheral area located around the pixel area.

10 Claims, 18 Drawing Sheets

ELECTRO-OPTICAL DEVICE, MANUFACTURING METHOD THEREOF, AND ELECTRONIC APPARATUS

BACKGROUND

1. Technical Field

The present invention relates to an electro-optical device, a method of manufacturing the electro-optical device, and an electronic apparatus such as a liquid crystal projector.

2. Related Art

An electro-optical device is set in a checking device for testing a power source and a picture signal so as to be checked or adjusted before the electro-optical device is completed or delivered. Subsequently, after checking and adjustment are finished, the electro-optical device separates from the check device, and then charge of a signal remains in a peripheral circuit or lines of the electro-optical device. When the charge remains, it is difficult to check or adjust the electro-optical device in detail.

Accordingly, JP-A-3173200 discloses a technology In which exterior circuit connecting terminals connected to a picture signal line or a potential line of a counter electrode from an exterior of an electro-optical device are connected to each other with a discharging resistor or a grounding switch therebetween.

However, according to JP-A-3173200, the connecting-discharging resistor or the grounding switch is required to be installed in the electro-optical device. Even though the connecting-discharging resistor or the grounding switch are installed on a substrate, there is a technical problem in that other elements on the substrate may be influenced when a contact hole or line is formed in order to connect the picture signal line or the potential line of the counter electrode to the connecting-discharging resistor or the grounding switch. In particular, in order to connect the constant-potential capacitor line forming an upper side electrode of the storage capacitor and the discharging resistor formed below the storage capacitor, which may deteriorate the dielectric film, a contact hole is formed by direct etching and the like. Accordingly, there is a technical problem that the storage capacitor is degraded.

SUMMARY

An advantage of some aspects of the invention is to provide an electro-optical device capable of electrically connecting a conductive film above a dielectric film and a conductive film below the dielectric film to each other without affecting characteristics of the dielectric film, a method of manufacturing the electro-optical device, and an electronic apparatus having the electro-optical device.

According to an aspect of the invention, there is provided an electro-optical device including a plurality of pixel electrodes, storage capacitors which are provided below the plurality of pixel electrodes with an inter-layer insulating layer disposed therebetween and in which a lower electrode, a dielectric film, and an upper electrode are sequentially laminated, an extending section extending from the dielectric film, a first conductive film disposed above the extending section of the dielectric film, a second conductive film disposed below the extending section of the dielectric film, and a relay layer disposed above the first conductive film, at least formed of the same film as the plurality of the pixel electrodes, and electrically connecting the first conductive film to the second conductive film, wherein the plurality of pixel electrodes and the storage capacitors are provided in a pixel area on a substrate, and the extending section, the first conductive film, the second conductive film, and the relay layer are disposed in a peripheral area located around the pixel area.

In the electro-optical device according to the aspect of the invention, the plurality of pixel electrodes may be disposed in a matrix in the pixel area on the substrate. For example, a plurality of data lines and a plurality of scan lines may be disposed vertically and horizontally on the pixel area, the pixel electrode may be formed in an intersection of the data line and the scan line. Each pixel electrode may be electrically connected to the data line and the scan line with a pixel switching element electrically, which may be connected to the pixel electrode, therebetween. "The pixel area" indicates an area in which the plurality of pixel electrodes may be disposed in a plane view of the substrate, that is, the area where the plurality of pixel electrode may display an image. For example, "an image display area" may be an example of an aspect of the embodiment.

When the electro-optical device may be operated, for example, a scan signal may be provided so as to select the scan line. For example, when the scan signal may be provided from the selected scan line and the pixel switching element may be in an on-state, a picture signal may be provided to the pixel electrode from the data line and pixel switching element. As a result, an applied voltage may be applied to the pixel electrode and, for example, a counter electrode which may be opposite to the pixel electrode and may remain as a predetermined potential. Accordingly, in the electro-optical device, alignment state of electro-optical material such as liquid crystal interposed between the pixel electrode and the counter electrode may be changed such that incident light from a light source may be modulated and an image display may appear in the pixel area. In this case, a storage capacitor may improve a potential quality of the pixel electrode such that a high-contrast display may be possible.

According to the aspect of the invention, a first conductive film may be disposed on an extending section of a conductive film, and a second conductive film may be disposed below a dielectric film. Accordingly, for example, when the first conductive film may be connected to a ground potential with the discharging resistor which may be electrically connected to the second conductive film therebetween, and thus a charge remaining in the first conductive film may remove, the first conductive film may be necessary to electrically connect to the second conductive film.

A film of the first conductive film may be the same as that of the conductive film constituting the upper layer electrode of the storage capacitor, or other film may be possible. On the other hand, a film of the second conductive film may be the same as that of the conductive film constituting the lower layer electrode of the storage capacitor, or other films may be possible. There may be the dielectric film of the storage capacitor in an area between the first conductive film and the second conductive film in the laminated structure, and the extending section of the dielectric film may intervene. When the first conductive film itself is formed on the extending section, the dielectric film may prevent the first conductive film from patterning or exposing in an etching ambience for forming a contact hole.

In the electro-optical device according to the aspect of the invention, in particular, there is provided a relay layer of which a film may be the same as that of the plurality of pixel electrodes and which may be electrically connecting the first conductive film to the second conductive film. In this case, "the same film" may indicate a formed film in the course of manufacturing the electro-optical device, and may be the same type of film. "Formed of the same film" may not indicate one continuous film but it may be enough to be divided film parts. That is, for example, the relay layer is electrically connected to the first conductive film with the contact hole formed through inter-upper layer insulating film. The relay layer is electrically connected to the second conductive film through the contact hole formed through the inter-layer insulating film on the first conductive film and the extending section on the dielectric film. Accordingly, when the contact hole is formed to electrically connect the first conductive film to the second conductive film, a photo etching may finish so as not to be performed in a state the inter-layer insulating film does not exist on the extending section which is disposed below the first conductive film (namely, when the surface of the upper layer of the extending section is exposed in air or ambient atmosphere). That is, the photo-etching may be performed in the extending section of the dielectric film through the inter-layer insulating film laminated in an area where the first conductive film may not be formed, in a plain view of the substrate of the extending section of the dielectric film so as to form the contact hole (that is, the contact hole to electrically connect the relay layer to the second conductive film) to electrically connect the first conductive film to the second conductive film. The photo-etching is performed on the extending section of the dielectric film to form the contact hole, thereby preventing the dielectric film constituting the storage capacity connected to the pixel electrode 9$a$electrically from being degraded. Accordingly, the degradation of pixel quality such as a reduction in contrast of the image display may be restrained or prevented.

As described above, the first conductive film may be electrically connected to the second conductive film with the relay layer therebetween, thereby having a bad effect on the dielectric quality. Accordingly, the first conductive film has lower resistance when the first conductive film is electrically connect to the second conductive film than when the first conductive film is not electrically connected to the second conductive film.

The exterior circuit connecting terminal to connect the first conductive film to the exterior circuit may be formed of the second conductive film. That is without forming the first conductive film, the exterior circuit connecting terminal may be formed of the second conductive film connected to the first conductive film. Namely, the film of the exterior circuit connecting terminal may be formed of the same as that of the second conductive film or other conductive film that is electrically connected to the second conductive film. For example, a plurality of exterior circuit connecting terminals including the exterior circuit connecting terminal to connect other circuit to the exterior circuit may be uniformly formed of the same film as the second conductive film and the same film as the plurality of exterior circuit connecting terminals. Accordingly, the upset of the rubbing roll due to the etching-depth difference (that is, nap upset of a cross-martial of the rubbing roll) may be almost prevented and the rubbing may be performed uniformly. As a result, the rubbing scratch can be restrained or prevented in the image display.

In the electro-optical device according to the aspect of the invention, the relay layer may be electrically connected to the first conductive film through a first contact hole formed through the inter-layer insulating film and may be electrically connected to the second conductive film through a second contact hole formed through at least the inter-layer insulating film and the extending section.

According to the aspect of the invention, the first conductive film may be connected to the second conductive film through the first and second contact holes with the relay layer therebetween. In particular, in the manufacturing process the extending section of the dielectric film may be exposed, the etching may not be performed to the dielectric film and thus it may be possible to be connected through the dielectric film from the upper to the lower.

In the electro-optical device according to another aspect of the invention, the relay layer may be disposed in the peripheral area.

According to the aspect of the invention, the first conductive film may be electrically connected to the second conductive film with the relay therebetween, without almost hindering an image display or never hindering the image display.

In the electro-optical device according to another aspect of the invention, there is provided a counter substrate disposed opposite the substrate and a seal section bonding the substrate and the counter substrate, and the relay layer may be disposed in a seal area in which the seal section may be formed in the peripheral area.

Accordingly, the first conductive film may be electrically connected to the second conductive film with the relay layer therebetween, without almost hindering an image display or never hindering the image display, and almost increasing a substrate size or never increasing the substrate size.

In the electro-optical device according to another aspect of the invention, there is provided a third conductive film disposed below the second conductive film and electrically connected to the second conductive film.

According to the aspect of the invention, since the first conductive film and the second conductive film may be electrically connected to the third conductive film, the electro-optical device has a redundancy structure. Accordingly, lines constituting at least the first conductive film may have lower resistance.

In the electro-optical device according to another aspect of the invention, there is provided a discharge resistor formed of at least a film having a resistance higher than that of the first conductive film and electrically connected to the second conductive film.

According to the aspect of the invention, the first conductive film may be connected to the ground potential, for example, with the discharging resistor electrically connected to the second conductive film, and, for example, after separating the first conductive film from a checking device, charge remaining in the first conductive film may be removed.

In the electro-optical device according to another aspect of the invention, the first conductive film may constitute a capacitor line electrically connected to the upper electrode.

According to the aspect of the invention, since the relay layer may connect the capacitor line that is formed of the first conductive film constituting a film equal to upper electrode or another film to the second conductive film, the capacitor line may have low resistance. The exterior circuit connecting terminal to connect the capacitor line to the exterior circuit may be formed of the second conductive film. In this case, "the capacitor line electrically connected to the upper electrode" may also indicate that the capacitor line and the upper electrode may be integrally formed. The film of the first conductive film may be formed of the same as that of the upper electrode. In other words, a part of the capacitor line may also serve as the upper electrode.

In the electro-optical device according to another aspect of the invention, there is provided a counter electrode opposite the plurality of pixel electrodes and the first conductive film may form a counter-electrode potential line supplying a predetermined potential to the counter electrode.

According to the aspect of the invention, since the relay layer may connect the potential line of the counter electrode to the second conductive film, the potential line of the counter electrode may have low resistance. The exterior circuit connecting terminal to connect potential line of the counter electrode to the exterior circuit may be formed of the second conductive film.

According to another aspect of the invention, there is provided a method of manufacturing an electro-optical device including a plurality of pixel electrodes disposed in a pixel area, storage capacitors which may be disposed below the plurality of pixel electrodes with an inter-layer insulating film therebetween and in which a lower electrode, a dielectric film, and an upper electrode may be sequentially laminated, a first conductive film disposed on an extending section of the dielectric film, and a second conductive film disposed below the dielectric, on a substrate, and the method of forming the second conductive film in an area where the second conductive film may be formed; the method of sequentially laminating the lower electrode and the dielectric film in an area where the storage capacitor may be formed so as to be disposed above the second conductive film; the method of forming the storage capacitor by laminating the upper electrode on the dielectric film and in an area where the storage capacitor may be formed and forming the first conductive film on the extending section; the method of laminating the inter-layer insulating film above the storage capacitor, the first conductive film, and the dielectric film; the method of forming a first contact hole through the inter-layer insulating film so as to electrically connect a relay layer, which may electrically connect the first conductive film to the second conductive film, to the inter-layer insulating film; the method of forming a second contact hole through the inter-layer insulating film and the extending section so as to electrically connect the relay layer to the second conductive film; and the method of forming the plurality of the pixel electrodes in the pixel area and forming the relay layer out of the same film as the plurality of pixel electrodes.

According to another aspect of the invention, there is provided a method of manufacturing an electro-optical device described above. In particular, the film of the relay may be formed of the same as that of the plurality of the pixel electrode with the inter-layer insulating film from the dielectric film therebetween. Since the etching that is performed on the dielectric film may be not necessary to be performed so as to form the second contact hole, it may be possible to be connected through the relay layer and the dielectric film of the second conductive film from the upper to the lower. Accordingly, the first conductive film may be electrically connected to the second conductive film with the relay layer therebetween, without having a bad effect on the characteristics of the dielectric film.

According to another aspect of the invention, there is provided an electronic apparatus including the above-mentioned electro-optical device (including a variety of aspects thereof).

According to the aspect of the invention, the electronic apparatus may include the electro-optical device and may be used a high-quality display unit of TVs, a mobile phone, an electronic pocket book, word-processors, a viewfinder type or monitor direct view type of videotapes, recorders, workstations, television phones, POS terminals, a touch panel, or the electro-optical device may be used in various types of the electronic apparatus such as a printer using the electro-optical device as an exposed header, a photocopier, an electronic facsimile. The electronic apparatus includes a field emission display and a conduction electron-emitter display such as electronic pagers.

An operation and other advantage according to an aspect of the invention may be clear in the following embodiment.

DESCRIPTION OF EXEMPLARY EMBODIMENTS

Hereinafter, an aspect of a first embodiment of the present invention is described, with reference to drawings. In an aspect of the first embodiment, a liquid crystal device of a TFT active matrix driving method will be explained as an example of an electro-optical device.

First Embodiment

A liquid crystal device according to an aspect of a first embodiment of the present invention is described, with reference to FIGS. 1 to 14.

Figure 1:
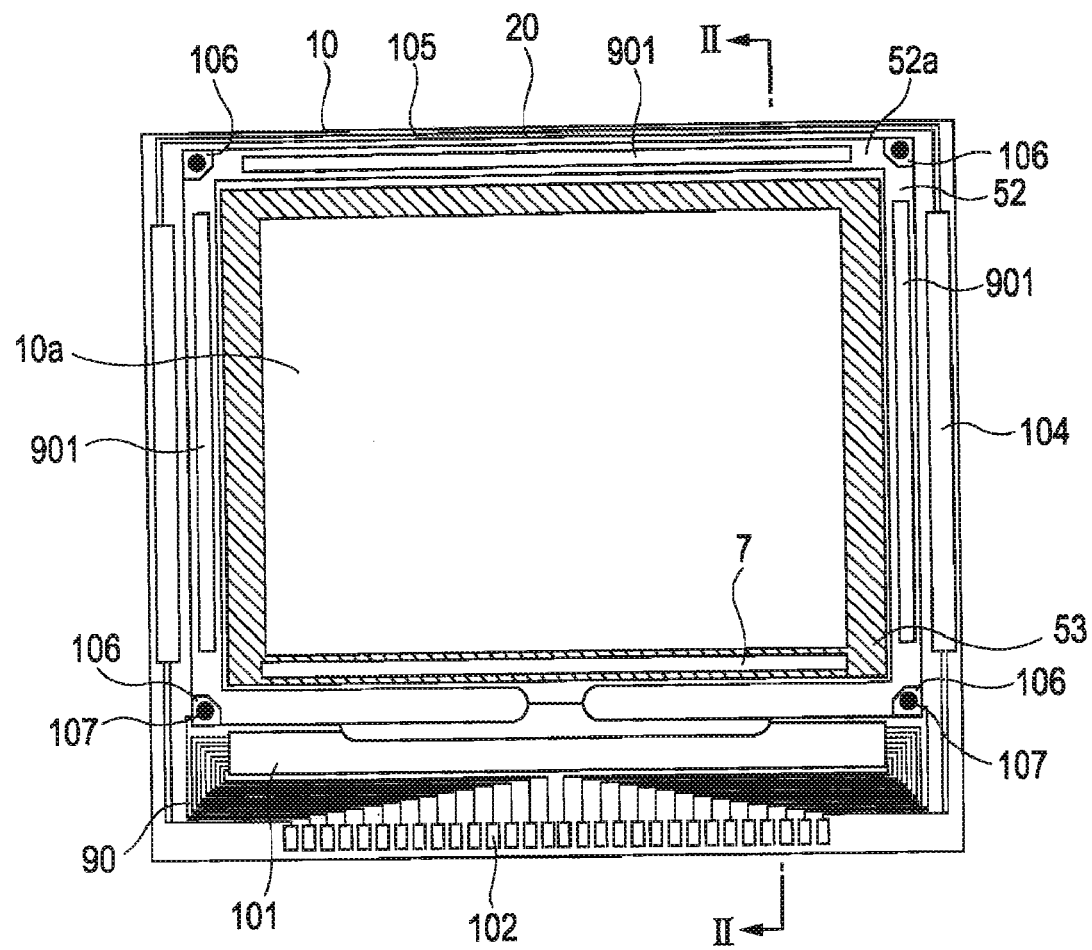
FIG. 1 is a plane view illustrating an entire configuration of a liquid crystal device according to a first embodiment.

First, an overall configuration of the liquid crystal device according to an aspect of the embodiment will be described with reference to FIGS. 1 and 2. FIG. 1 is a plain view and FIG. 2 is a cross sectional view taken along the line H-H' in FIG. 1.

Figure 2:
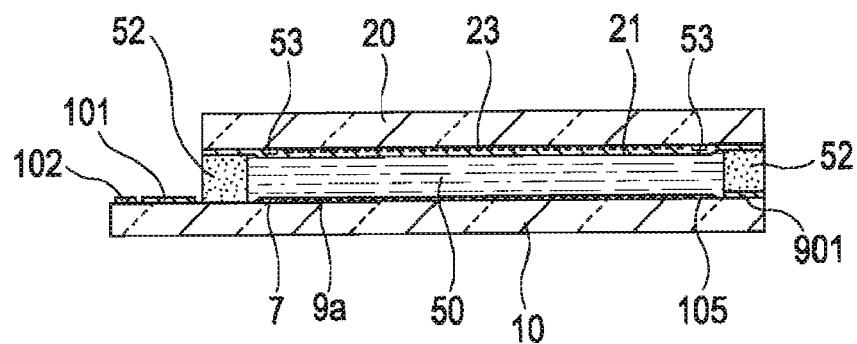
FIG. 2 is a cross-sectional view taken along the line H-H' in FIG. 1.

As shown FIGS. 1 and 2, a TFT array substrate 10 and a counter substrate 20 are disposed in the liquid crystal device according to an aspect of the embodiment. A liquid crystal layer 50 is sealed between the TFT array substrate 10 and the TFT array substrate 10, and the counter substrate 20 is bonded to a seal section 52 disposed on a seal area 52a located near an image display area, an example of "an image area" according to an aspect of the invention.

As shown FIG. 1, a frame light-shielding film 53 parallel to an interior side of the seal area 52a where the seal section 52 is disposed and defining a frame area of the image display area 10a is disposed on the counter substrate 20. A data line driving circuit 101 and an exterior circuit connecting terminal 102 are disposed along one side of the TFT array substrate 10 on an area located on the exterior side of the seal area 52a on which the seal section 52 is disposed. Along one side inside the seal area 52a, a sampling circuit 7 is disposed so as to be covered by the case light-shielding film 53. Further, two scan line driving circuits 104 are disposed along two sides outside the seal area 52a. In order to connect the two scan line driving circuits 104 disposed on the two sides of the image display area 10a, a plurality of wiring lines 105 are disposed along the rest side of the TFT array substrate 10 furthest from the exterior circuit connecting terminal 102. Upper-lower conductive terminals 106 are disposed in 4 corners of the counter substrate 20 on the TFT array substrate 10 such that upper-lower conductive sections 107 connect both substrates. Accordingly, it is possible to electrically connect between the TFT array substrate 10 and the counter substrate 20.

In the embodiment, as described in FIGS. 10 to 14, a relay layer 901, a first relay line 910, and a second relay line 920 are preferably formed in the seal area 52a.

In order to electrically connect the exterior circuit connecting terminal 102 and the data line driving circuit 101, the scan line driving circuit 104, and the upper-lower conductive terminal 106, a drawing wiring 90 is formed on the TFT array substrate 10.

In FIG. 2, a pixel switching TFT (thin film transistor), a driving element, and the wiring lines such as the scan line, and the data line are laminated on the TFT array substrate 10. On the image display area 10a, a pixel electrode 9a is disposed on the upper layer of the wiring lines such as the pixel switching TFT, the scan line, and the data line. The relay layer 901 is formed in the seal area 52a as described below, and the film of the relay layer 901 is the same as that of the pixel electrode 9a. On the other hand, a light-shielding film 23 is formed on the surface of the counter substrate 20 facing the TFT array substrate 10. A counter electrode 21 formed of transparent materials such ITO and the like is formed on the light-shielding film 23, facing the plurality of the pixel electrode 9a. Further, a liquid crystal layer 50 is formed of, for example, liquid crystal in which one or several types of nematic liquid crystal are mixed, and is in predetermined aligned state at a location between a pair of alignment films.

Besides the data line driving circuit 101 and the scan line driving 104a, a discharging resistor not illustrated described below is formed on the TFT array substrate 10. In order to detect quality, defects, and the like of the liquid crystal device at the time of producing or shipping, a detecting circuit, a detecting pattern, and the like can be formed.

Figure 3:
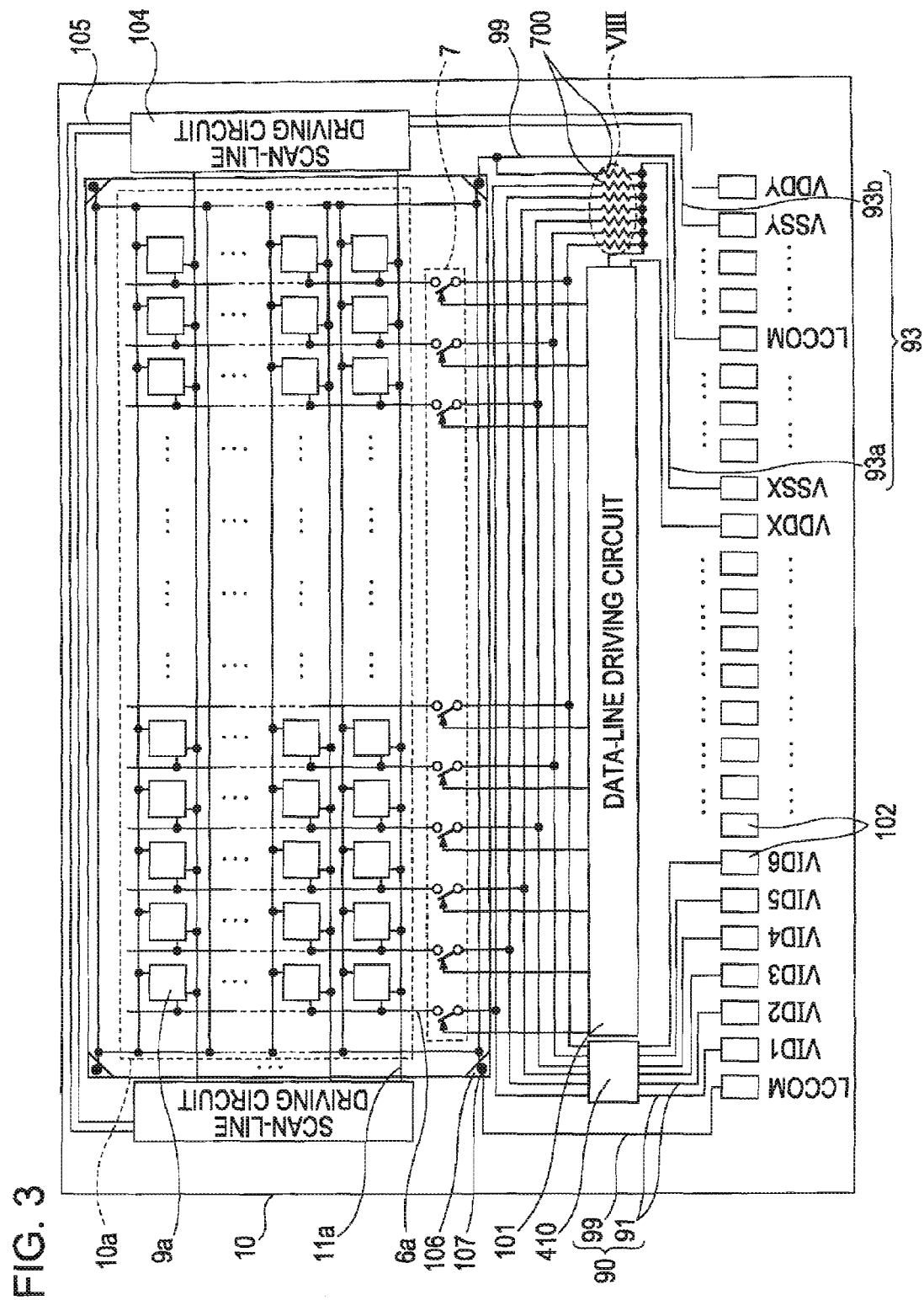
FIG. 3 is a plane view illustrating major sections of a liquid crystal device according to a first embodiment.

Next, a major configuration of the liquid crystal device will be described, with reference to FIG. 3. FIG. 3 is a plain view illustrating a configuration of the main units of the liquid crystal device according to an aspect of the embodiment.

In FIG. 3, the liquid crystal device includes the TFT array substrate formed of quartz, glass, silicon, and the like and the counter substrate 20 (see FIG. 2) with the liquid crystal layer interposed therebetween. In the image display area 10a of the liquid crystal device, voltage applied into the pixel electrode 9a arranged separately is controlled, and electric voltage in the liquid crystal layer 50 (see FIG. 2) is modulated in each pixel. Amount of transmitted light is controlled to display a gray-scale image. The liquid crystal device employs a TFT active matrix driving mode. On the image display area 10a in the TFT array substrate 10, a plurality of the pixel electrodes 9a arranged in a matrix are formed and a plurality of the scan lines 11a and a plurality of the data lines 6a are arranged so as to intersect, thereby forming a pixel section. Further, driving circuits such as the data line driving circuit 101, the exterior circuit connecting terminal 102, and an electrostatic discharge protecting circuit 410 are formed near the image display area 10a. For example, the electrostatic discharge protecting circuit 410 according to this embodiment has the drawing line 90 connected to a power source line and the like through a TFT connected to a diode. However, other type of the electrostatic discharge protecting circuit 410 may be implemented in a different manner. In addition, a picture signal line 91 for supplying picture signals VID1 to VID6, a second power source signal VSSX which is a power source of grounding potential, and a plurality of drawing line 90 including the grounding potential line 93 that provides VSSY are drawn from the exterior circuit connecting terminal 102 to the driving circuits such as the data line driving circuit 101.

The counter electrode 21 facing the pixel electrode 9a is formed on the counter substrate 20 (see FIG. 2). The drawing line 90 also includes a potential line 99 of the counter electrode providing counter electrode potential LCCOM for the counter electrode 21. The counter electrode potential LCCOM is an example of "predetermined potential" according to an aspect of the invention. The upper-lower conductive terminal 106 is also formed on the TFT array substrate 10 in order to electrically connect the counter electrode potential line 99 and the counter electrode 21, and the upper-lower conductive section 107 is disposed between the TFT array substrate 10 and the counter substrate 20 (see FIG. 2) in order to electrically connect the upper-lower conductive terminal 106 and the counter electrode 21 (see FIG. 2).

The picture signal line 91 and the counter electrode potential line 99 are electrically connected to a grounding potential line 93a with the discharging resistor 700, which is a high-resistor, therebetween. The conductive layers constitute the picture signal line 91, the potential line 99 of the counter electrode, and the grounding potential line 93.

Next, operation of the liquid crystal device according to an aspect of the embodiment will be described with reference to FIG. 3.

When the liquid crystal device according to an aspect of the embodiment operates, a clock signal is provided for the exterior circuit-connecting terminal 102 and the drawing line 90 from the exterior circuit connected to the exterior circuit-connecting terminal 102 with FPC and the like therebetween, in order to operate the data line driving circuit 101, and various types of signal such as a first power source signal VDDX, the second power source VSSX, a controlling signal, and the picture signals VID1 to VID6 are provided for the data line driving circuit 101. The clock signal and the various signals such as the first power source signal VDDX, the second power source VSSX, the controlling g signal, and the picture signals VID1 to VID6 are provided for the exterior circuit connecting terminal 102, the drawing line 90, and the scan line driving circuit 104 from the exterior circuit. The picture signals VID1 to VID6 are provided for the sampling circuit 7 through the picture signal line 91 of the drawing line 90. On the other hand, the counter electrode potential LCCOM is provided for the counter electrode 21 (see FIG. 2) through the potential line 99 of the counter electrode of the line 90 and through the upper-lower conductive terminal 106 and the upper-lower section 107. The data line driving circuit 101 provides the picture signals VID1 to VID6 for the pixel section through the data line 6a, and the scan line driving circuit 104 provides a scan signal for the pixel section through the scan line 11a. The liquid crystal layer 50 interposed between the pixel electrode 9a and the counter electrode 21 is driven in the pixel section, thereby driving an active matrix.

Figure 4:
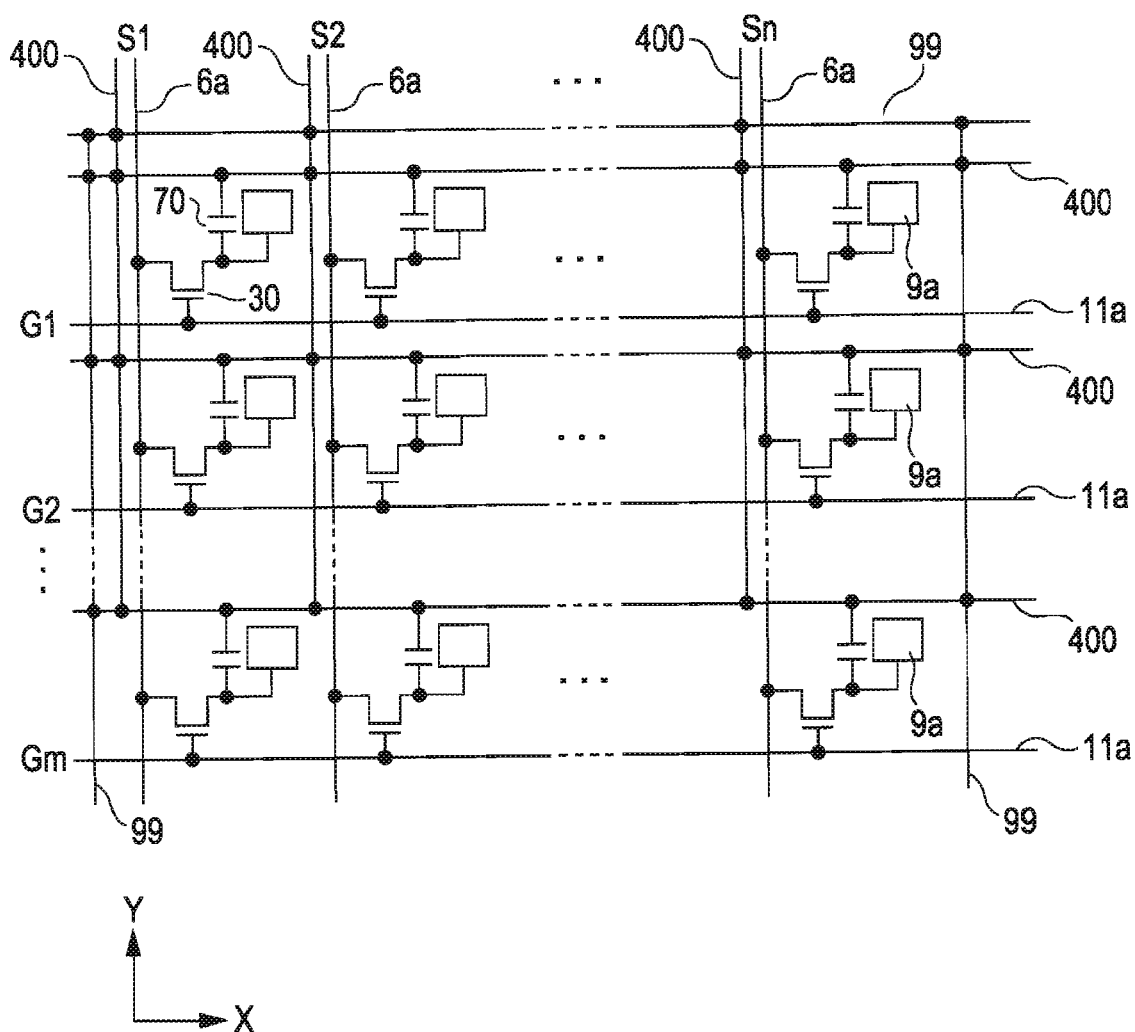
FIG. 4 is an equivalent circuit diagram of illustrating a plurality of pixel sections of a liquid crystal device according to a first embodiment.
Figure 5:
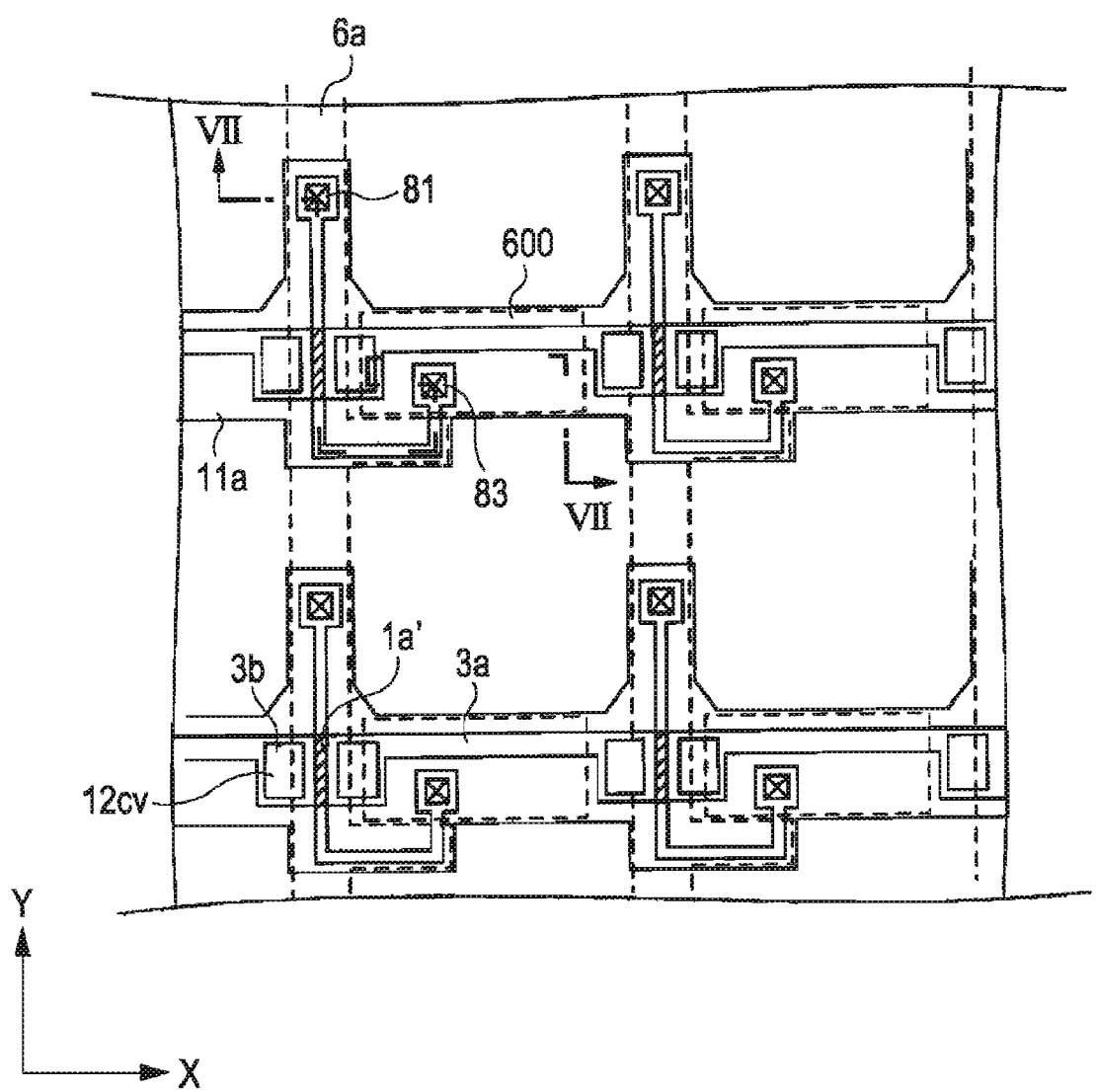
FIG. 5 is a plane view of illustrating a part configuration (a lower part) related to a pixel section.
Figure 6:
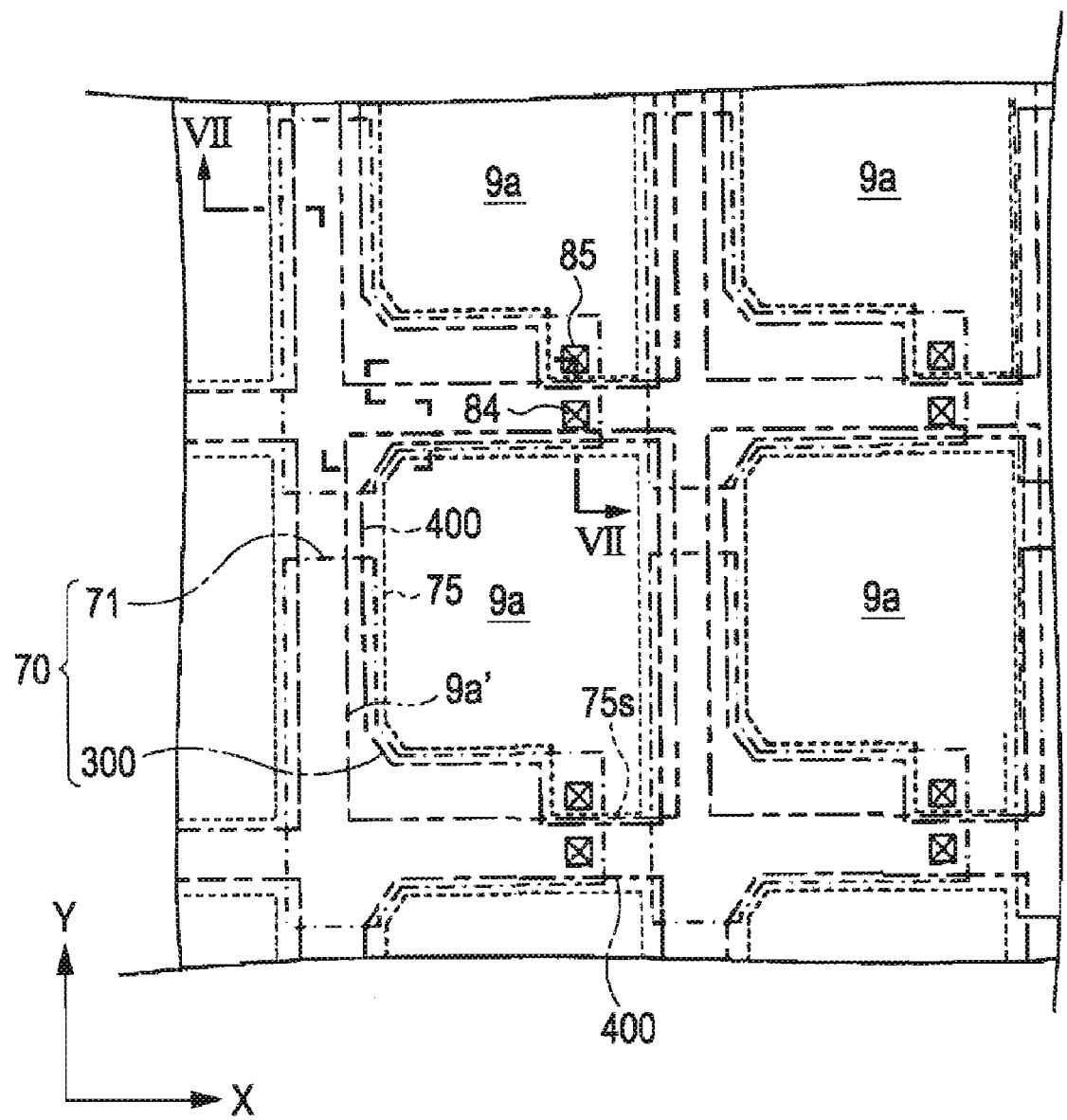
FIG. 6 is a plane view of illustrating a part configuration (an upper part) related to a pixel section.
Figure 7:
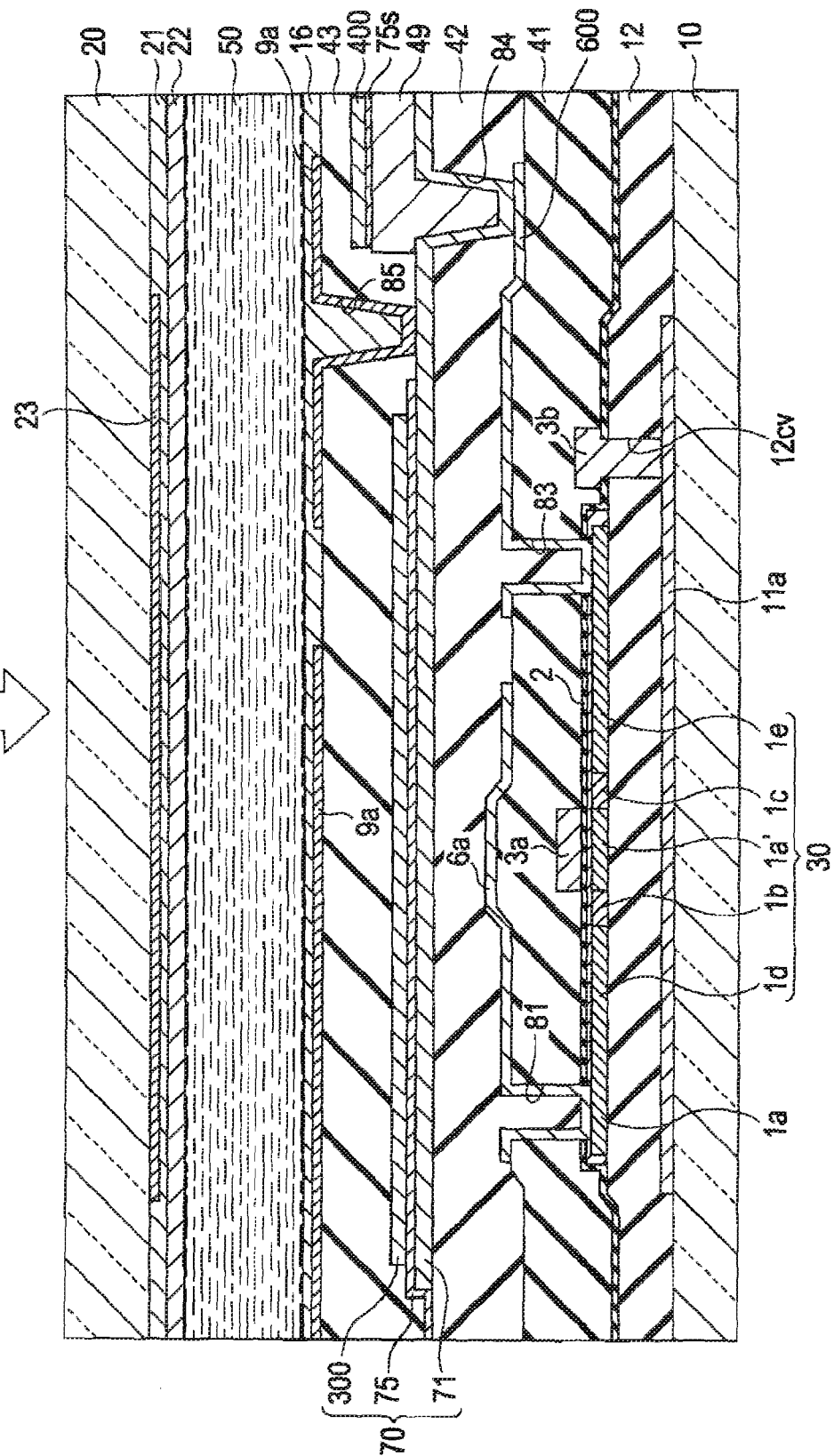
FIG. 7 is a cross-sectional view taken along the line A-A' in the case of overlapping FIGS. 5 and 6.

Next, a configuration of the pixel section according to an aspect of the embodiment is described with reference to FIGS. 4 to 7. FIG. 4 is an equivalent circuit diagram of various types of elements, lines, and the like of the plurality of pixels arranged in a matrix forming the image display area of the liquid crystal device. FIGS. 5 and 6 are plane views illustrating parts related to the pixel section on the TFT array substrate and correspond to a lower layer part (FIG. 5) and an upper layer part (FIG. 6) of laminated layers described below. FIG. 7 is a cross-sectional view of the parts shown in FIGS. 5 and 6. In FIG. 7, scales of each section on each layer are different in order to distinguish between each section on the drawing.

In FIG. 4, TFTs 30 are formed in the plurality of the pixels arranged in a matrix forming the image display area 10a of the liquid crystal device according to an aspect of the embodiment, in order to switch the pixel electrodes. Each of the data lines 6a is electrically connected to a source of a corresponding one of the TFTs 30 in order to receive the picture signal. The picture signals S1, S2, . . . , Sn may be provided to each of the data lines 6a sequentially, or the plurality of data lines 6a as a group.

Each of the scan lines 3a is electrically connected to a gate of a corresponding one of the TFTs 30, and thus, each of the scan lines 3a is provided with scan signals G1, G2, . . . , Gm sequentially as pulses at a predetermined timing. Each of the pixel electrodes 9a is electrically connected to a drain of a corresponding one of the TFTs 30. When the TFTs 30, the switching elements, are closed for some time, the picture signals S1, S2, . . . , Sn provided from the data lines 6a enter at the predetermined timing.

The predetermined level of the picture signals S1, S2, . . . , Sn provided through the pixel electrodes 9a are stored between the pixel electrodes 9a and the counter electrodes on the counter substrate for some time. The liquid crystal enables gray scale display by changing a molecular association or order according to a level of applied voltage. In a white mode, a transmissivity of incident light decreases according to applied voltage in each pixel unit, whereas in a black mode, the transmissivity of the incident light increases according to applied voltage in each pixel unit. Accordingly, there is light having a contrast according to the picture signal from the liquid crystal device.

In order to prevent the stored picture signal from leaking, storage capacitors 70 are disposed parallel to liquid crystal capacitors formed between the pixel electrodes 9a and the counter electrodes. One electrode of each of the storage capacitors 70 is parallel to a corresponding one of the pixel electrodes 9a and connected to the drain of the TFTs 30, and another electrode is connected to capacitor lines 400 connected to the potential line 99 of the counter electrodes electrically so as to be the potential line 99 of a corresponding counter electrode. The capacitor lines 400 are disposed along the scan lines 11a and the data lines 6a, that is, in the vertical and horizontal directions (the X direction and the Y direction) of the image display area 10a.

Next, the detailed configuration of the pixel section described above will be described, with reference to FIGS. 5 to 7.

In FIGS. 5 to 7, each circuit element of the pixel section described above is patterned so as to be disposed on the TFT array substrate 10 as a laminated conductive film. The TFT array substrate formed of, for example, glass, quartz, SOI, or semiconductor material is disposed opposite the counter substrate 20 formed of, for example, glass or quartz. In addition, each circuit element constitutes at least a first layer including a corresponding one of the scan lines 11a, a second layer including the TFTs 30 and the like, a third layer including the data lines 6a and the like, a fourth layer including the storage capacitors 70 and the like, and a fifth layer including a corresponding one of the pixel electrodes 9a and the like. A grounding insulating film 12 between the first and second layers, a first inter-layer insulating film 41 between the second and third layers, a second inter-layer insulating film 42 between the third and the fourth layer, a third inter-layer insulating film 43 between the fourth and fifth layers, and an inter-layer insulating film 49 are disposed, respectively, so as to prevent the described inter-elements from being shortcircuited. FIG. 5 illustrates the lower part, the first layer to the third layer, and FIG. 6 illustrates the upper part, the fourth layer to the fifth layer.

First Layer Configuration—Scan Line, and the Like—

A first layer constitutes one of the scan lines 11a. The one of the scan lines 11a at least shapes a main section extending along the x axis and a projection section extending to the Y axis in FIG. 5. The one of the scan lines 11a is formed of, for example, conductive poly-silicon and may be formed of a metal-simple substance including at least one of a plurality of high-melting metals such as Ti, Cr, W, Ta, and Mo, mixed metal, metal silicide, poly-silicide, or a laminated layer, and the like. The one of the scan lines 11a is arranged so as to include an area facing a channel area 1a' on the lower layer. Accordingly, when a multi-layer projector is constructed by using backside reflection of the TFT array substrate 10 or the liquid crystal device as a light valve, the one of the scan lines 11a may shield light from the lower layer in the channel area 1a', and may even shield returned light such as light that is generated from other liquid crystal devices and transmits a mixed optic system such as a prism.

Second Layer Configuration—TFT, and the Like—

A second layer constitutes the TFT 30. For example, the TFT 30 has a LDD (lightly doped drain) structure, and includes a gate electrode 3a, a semiconductor layer 1a, and an insulating film 2 including a gate-insulating film insulating the gate electrode 3a and the semiconductor layer 1a. For example, the gate electrode 3a is formed of conductive poly-silicon. For example, the semiconductor 1a is formed of poly-silicon, and constitutes the channel area 1a', a low-concentration source area 1b, and a low-concentration drain area 1c, and at least a high-concentration source area 1d and a high-concentration drain area 1e. It is preferable that the TFTs 30 have the LDD structure, but the TFTs 30 may have an offset structure that does not inject impure substance into the low-concentration source area 1b and the low concentration drain area 1c and may have an alignment structure forming the high concentration source area and the high-concentration drain area by using the gate electrode 3a as a mask and injecting the impure substance at a high concentration.

The gate electrode 3a of each of the TFTs 30 is electrically connected to a corresponding one of the scan lines 11a in a gate electrode 3b, a part of the gate electrode 3a, with a contact hole 12cv formed in the ground insulating film 12 therebetween. For example, the ground insulating film 12 is formed of a silicon oxide film and has a function that prevents the TFT 30 element from being deteriorated due to a hitch or stain caused by polishing of the substrate surface when being formed in the entire surface of the TFT array substrate 10, as well as a function that insulates between the first and the second layers.

The TFT 30 according to an aspect of the embodiment is an upper gate type, but a lower gate type is also acceptable.

Third Layer Configuration—The Data Line, and the Like—

A third layer constitutes the data lines 6a and a relay layer 600.

Each of the data lines 6a is formed of a three-layer film of aluminum, titanium nitride, titanium silicon in lower order of. Each of the data lines 6a is formed so as to partly cover the channel area 1a' of the TFT 30. Accordingly, each of the data lines 6a that can be disposed near the channel area 1a' can shield incident light entering from the upper layer in the channel area 1a'. In addition, each of the data lines 6a is electrically connected to the high-concentration source area 1d with a contract hole 81 crossing though the first inter-layer insulating film 41 therebetween.

A conductive film that has lower reflective index than the conductive film such as an A1 film and the like constituting the body of the data lines 6a may be formed on the side facing the channel area 1a' of data lines 6a. Accordingly, light returned from the side facing the channel area 1a' of the data lines 6a is reflected so as to prevent multiple-reflected light or strayed light from generate.

A film of the relay layer is formed of the same as that of each of the data lines 6a. The relay layer and each of the data lines 6a are decoupled, as shown in FIG. 5. Further, the relay layer 600 is electrically connected to the-high concentration drain area 1e with the contact hole 83 through the first inter-layer insulating film 41 therebetween.

For example, the first inter-layer insulating film 41 is formed of the NSG (non-silicate glass). Further, silicate glasses such as PSG (phosphorus-silicate glass), BSG (boron-silicate glass), BPSG (boron phosphorus-silicate glass), nitride silicon, and oxide silicon are employed in the first inter-layer insulating film 41.

Fourth Layer Configuration—The Storage Capacitor Line, and the Like—

A fourth layer constitutes the storage capacitors 70 and the storage lines 400. Each of the storage capacitors 70 includes a corresponding one of storage electrodes 300 and lower electrodes 71, and a corresponding one of the dielectric films 75 is interposed therebetween.

Each of the storage electrodes 300 according to an aspect of the invention, an example of "an upper layer electrode", is electrically connected to a corresponding one of the storage lines 400, an example of "a first conductive film" and is stored in the potential LCCOM of the counter electrodes. That is, each of the storage electrodes 300 is integrally formed of the film that is the same as that of each of the storage lines 400 connected electrically to a corresponding one of the potential lines 99 of the counter electrodes.

The extending section of each of the lower electrodes 71 according to an aspect of the invention is an example of "a lower layer electrode", and is electrically connected to the relay layer 600 with a corresponding one of the contact holes 84 through the second inter-layer insulating film 42 therebetween. That is, each of the lower electrodes 71 is electrically connected to the high-concentration drain area 1e of a corresponding one of the TFTs 30 with a corresponding one of the lower electrodes 71 therebetween.

For example, each of the storage electrodes 300 or each of the lower electrodes 71 is preferably formed of a metal-simple substance including at least one of high-melting metals such as Ti, Cr, W, Ta, and Mo, mixed metal, metal silicide, poly-silicide, a laminated layer, or tungsten-silicide. Each of the storage capacitors 70 may be disposed closely on a corresponding one of the data lines 6a with the inter-layer insulating film 42 therebetween, and each of the storage capacitors 70 may more surely shield incident light from the upper layer in the channel area 1a' of a corresponding one of the TFTs 30.

As shown FIG. 6, the dielectric film 75 is formed in a non-forming area located in a gap of a formed area in each pixel in plane view of the TFT array substrate 10. That is, the dielectric film 75 is not almost formed in the formed area. Accordingly, even though the dielectric film 75 is an opaque film transmissivity of the formed area does not decrease. Accordingly, regardless of transmissivity, the dielectric film 75 is formed of plasmatic silicon nitride film (pSiN) that has high dielectric constant. Further, the dielectric film 75 has a function preventing moisture or wet and increasing water resistance or moisture resistance. Besides the silicon nitride film, for example, the dielectric film 75 is formed of a simple-layer or a multiple-layer such as hafnium oxide (Hf02), alumina (Al203), and tantalum oxide (Ta205).

As shown in FIG. 6, the dielectric film 75 is also extended between each of the storage capacitors 70 such that the extending section 75a is formed. For example, the inter-layer insulating film 49 on the lower layer of the extending section 75a in the dielectric film 75 is formed of NSG (see FIG. 7). That is, each of the lower electrodes 71, the inter-layer insulating film 49, and the extending section 75s are laminated in lower order of in an area (that is, an area each of the storage capacitors 70 is not formed) where each of the lower electrodes 71 is extended to be formed, in plane view of the TFT array substrate. Accordingly, each of the storage capacitors 70 will be formed on the area a corresponding one of the capacitors 70 should be formed. Besides the NSG, the inter-layer insulating film 49 is formed of silicate glasses, nitride silicon, or oxide silicon such as PSG, BSG, and BPSG.

For example, the second inter-layer insulating film 42 is formed of the NSG. Further, the second inter-layer insulating film 42 is formed of silicate glasses, nitride silicon, or oxide silicon such as PSG, BSG, and BPSG. A chemical mechanical polishing (CMP) method, a polishing method, a spin coat method, or a flattening method such as a concave implanting is used on the surface of the second inter-layer insulating 42. Accordingly, the uneven part due to the elements of the lower layer is removed so as to flatten the surface of the second inter-layer insulating film 42. Since it is likely to decrease feasibility that alignment state of the liquid crystal layer 50 interposed between the TFT array substrate 10 and the counter substrate 20 is dispersed, it is possible to implement a more high-quality display. In addition, such flattening method may be applied to a surface of other inter-layer insulating films.

Fifth Layer Configuration—The Pixel Electrode and The Like—

A third inter-layer insulating film 43 is formed on the fifth entire surface, and each of the pixel electrodes 9a, the fifth layer, is formed on the above. For example, the third inter-layer insulating film 43 is formed of the NSG. Besides the NSG, the third inter-layer insulating film 43 is formed of silicate glasses, nitride silicon, or oxide silicon such as PSG, BSG, and BPSG. The surface of the third inter-layer insulating film 43 is flattened by using methods like CMP as the same as the second inter-layer insulating film 42.

Each of the pixel electrodes 9a (the outline of dashed line 9a' in FIG. 6) is disposed in the image area arranged separately and horizontally, and each of the data lines 6a and each of the scan lines 11a are arranged on the border in a reticular pattern (see FIGS. 5 and 6). For example, each of the pixel electrodes 9a is at least formed of a transparent conductive film such as ITO (indium tin oxide).

Each of the pixel electrodes 9a is electrically connected to the extending section of a corresponding one of the lower electrodes 71 with a corresponding one of the contact holes 85 through the third inter-layer insulating film 43 (see FIG. 7). That is, each of the lower electrodes 71 becomes pixel potential.

The extending section of a corresponding one of the lower electrodes 71 and the relay layer 600 are electrically connected to the relay layer 600 and the high-concentration drain area 1e of a corresponding one of the TFTs 30 with each of contact holes 84 and 83. That is, each of the pixel electrodes 9a and the high-concentration drain area of a corresponding one of the TFTs 30 are relayed to the relay layer 600 and the extending section of a corresponding one of the storage electrodes 300. Accordingly, since a distance of the layers between each of the pixel electrodes 9a and the drain is long, difficulties in connecting the both to one contact hole is prevented. Further, complexity of the laminated layer structure and producing process cannot be arisen.

An alignment film 16 aligned by using a rubbing method is disposed on each of the pixel electrodes 9a.

Each of the pixel sections of the TFT array substrate 10 is described above.

On the other hand, each of the counter electrodes 21 is disposed on the entire counter substrate 20, and the alignment film 2 is disposed on each of the counter electrodes 21 (below each of the counter electrodes 21 in FIG. 7). Each of the counter electrodes 21 is formed of at least the transparent conductive film such as the ITO film as the same as each of the pixel electrodes 9a. In order to prevent light from leaking in each of the TFTs 30, a shielding light film 23 is disposed between the counter substrate 20 and a corresponding one of the counter electrodes 21 to cover a corresponding area opposite to a corresponding one of the TFTs 30.

The liquid crystal layer 50 is disposed between the TFT array substrate 10 and the counter substrate 20. The liquid crystal layer 50 encapsulates the liquid crystal in an area where edges of the TFT array substrate 10 and the counter substrate 20 are bonded by the seal section. Since the liquid crystal layer 50 is in a state of not applying an electric voltage between each of the pixel electrodes 9a and the counter electrodes 21, the liquid crystal layer 50 may be aligned in a predetermined state by the alignment films 16 and 22 aligned by using the rubbing method.

As shown in FIGS. 5 and 6, the configuration of each of the pixel sections is the same. Each of the pixel section is periodically formed on the image display area 10a described above (see FIG. 1) On the other hand, as described with reference to FIGS. 1 and 2, driving circuits such as the scan line driving circuit 104 and the data line driving circuit 101 are formed near the image display area 10a in the liquid crystal device.

Figure 8:
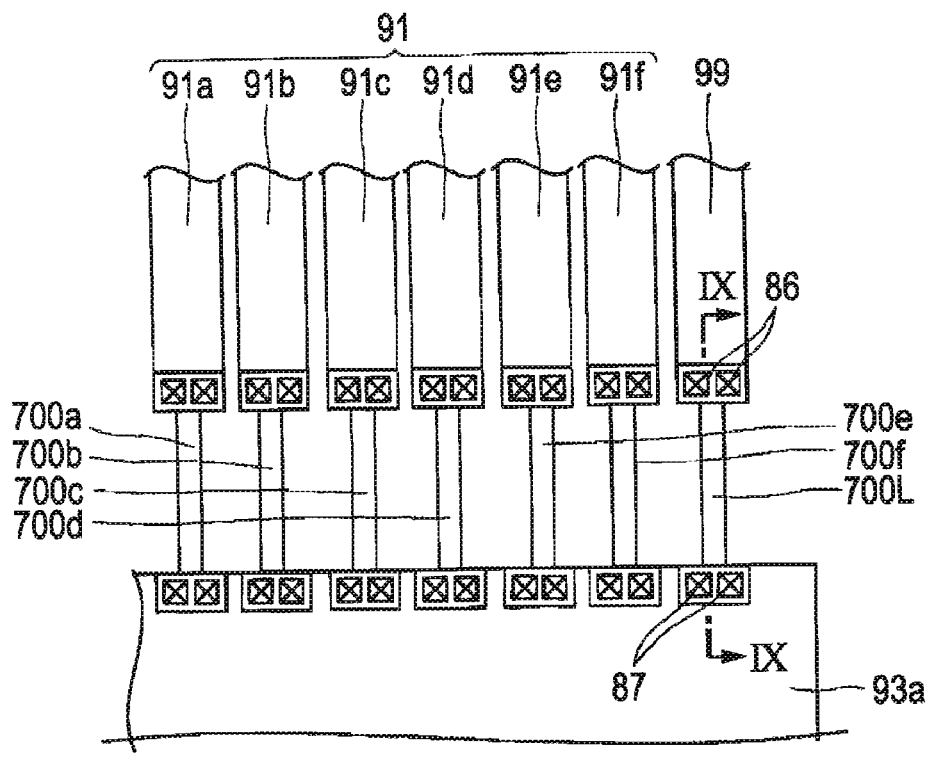
FIG. 8 is a partly expanded plane view of C1 in FIG. 3.
Figure 9:
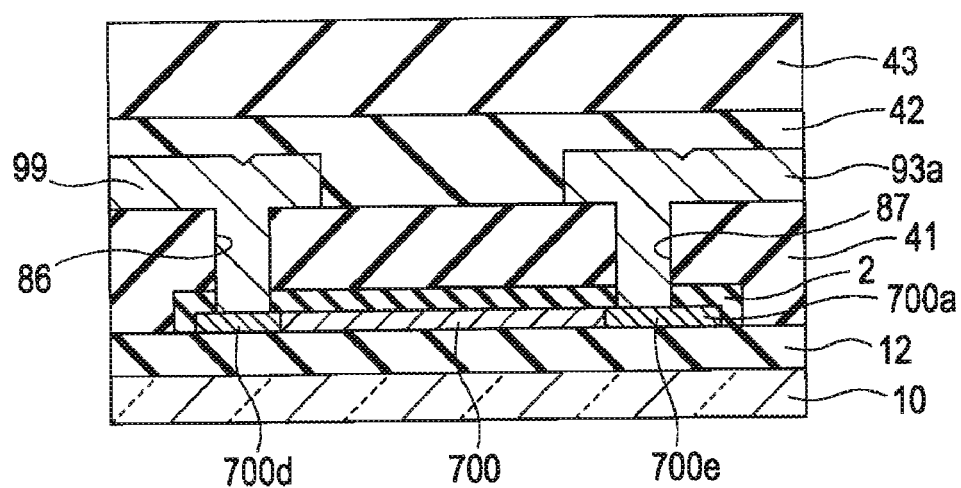
FIG. 9 is a cross-sectional view taken along the line B-B' in FIG. 8.

Next, a configuration of the discharging resistor according to an aspect of the embodiment will be described with reference to FIGS. 7, 8, and 9. FIG. 8 is a partly expanded plane view of C1 in FIG. 3. FIG. 9 is a cross-sectional view taken along the line B-B' in FIG. 8.

In FIG. 8, each of the potential line 99 of each of the counter electrodes is electrically connected to the grounding potential line 93a with a discharging resistor 700L of the discharging resistor 700 therebetween.

Each of the picture signal lines 91 constitutes a plurality of serially parallel-arranged picture signal lines 91a to 91f to which a plurality of picture signals VID1 to VID6 are provided, and the plurality of picture signal lines 91a to 91f are electrically connected to the grounding potential line 93a with one discharging resistor of a plurality of discharging resistors 700a to 700f in the discharging resistor 700 therebetween.

In FIG. 9, each of the discharging resistors 700 constitutes a corresponding one of the discharging resistors 700a formed of a semiconductor layer doped with an impure substance, though the ground insulating film 12 on the TFT array substrate 10. Each of the discharging resistors 700a has a resistance value different from other semiconductor films constituting semiconductor elements since the impure substance is doped exclusively different from the doped impure substance of the semiconductor film constituting the pixel-switching TFT. In each of the discharging resistors 700 and each connecting section of a corresponding one of the picture signal lines 91 and the potential lines 99 of a corresponding one of the counter electrodes, each of the discharging resistors 700d and discharging resistors 700e, doped parts by the impure substance with high concentration than each of the discharging resistors 700, exist partly. Each of the contact holes 86 and 87 linked with the discharging resistors 700d and 700e that are parts of the impure substance doped with high-concentration are formed on a corresponding one of the discharging resistors 700, and a first inter-layer insulating film 41 are formed on a corresponding one of the discharging resistors 700d and 700e.

Each of the picture signal lines 91d and each of the grounding potential lines 93a are formed on the first inter-layer insulating film 41. Each of the picture signal lines 91d is electrically connected to a corresponding one of the discharging resistors 700d, a doped part by the impure substance with high concentration, with a corresponding one of the contact holes 86 therebetween, and each of the grounding potential lines 93a is electrically connected to a corresponding one of the discharging resistors 700e, a doped part by the impure substance with high concentrations. The second inter-layer insulating film 42 and the third inter-layer insulating film 43 are sequentially formed thereon.

According to an aspect of the embodiment, each of the discharging resistors 700 is connected to a corresponding one of the grounding potential lines 93a for the data line driving circuit, but may be connected to a corresponding one of the grounding potential lines 93b for the scan line driving circuit.

Figure 10:
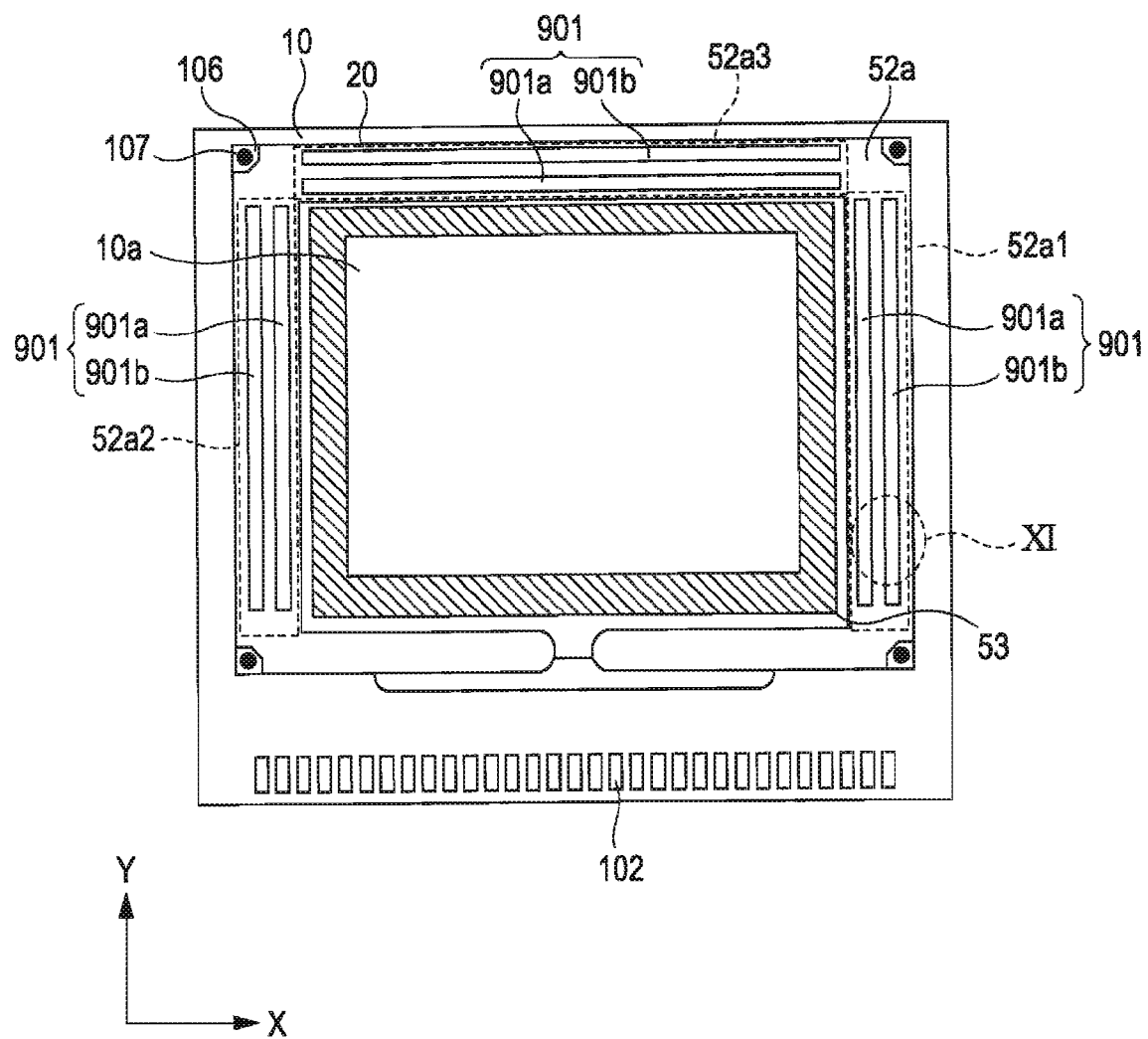
FIG. 10 is a plane view showing the frame of the TFT array substrate of the relay layer.
Figure 11:
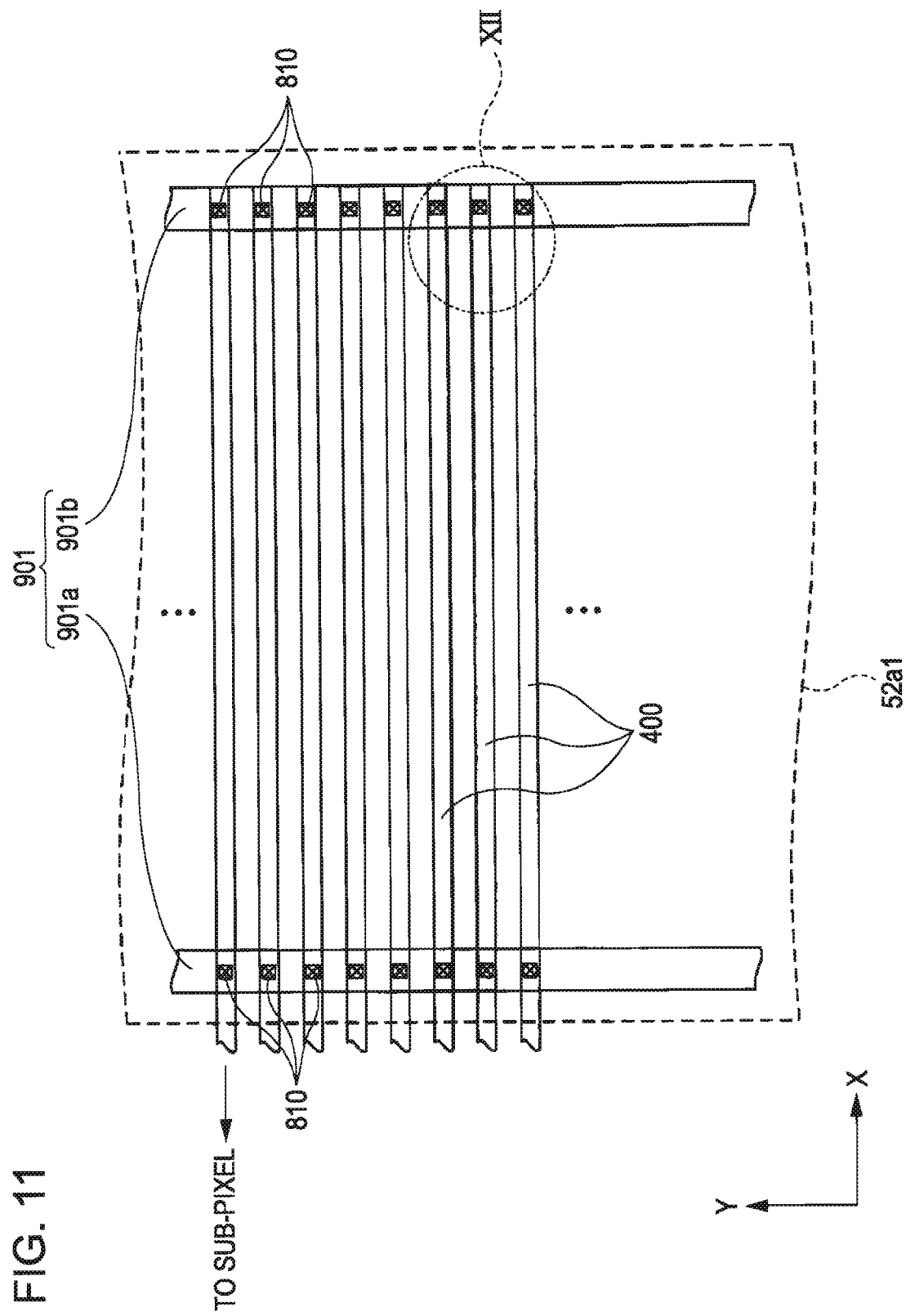
FIG. 11 is a partly expanded plane view of C2 in FIG. 10.
Figure 12:
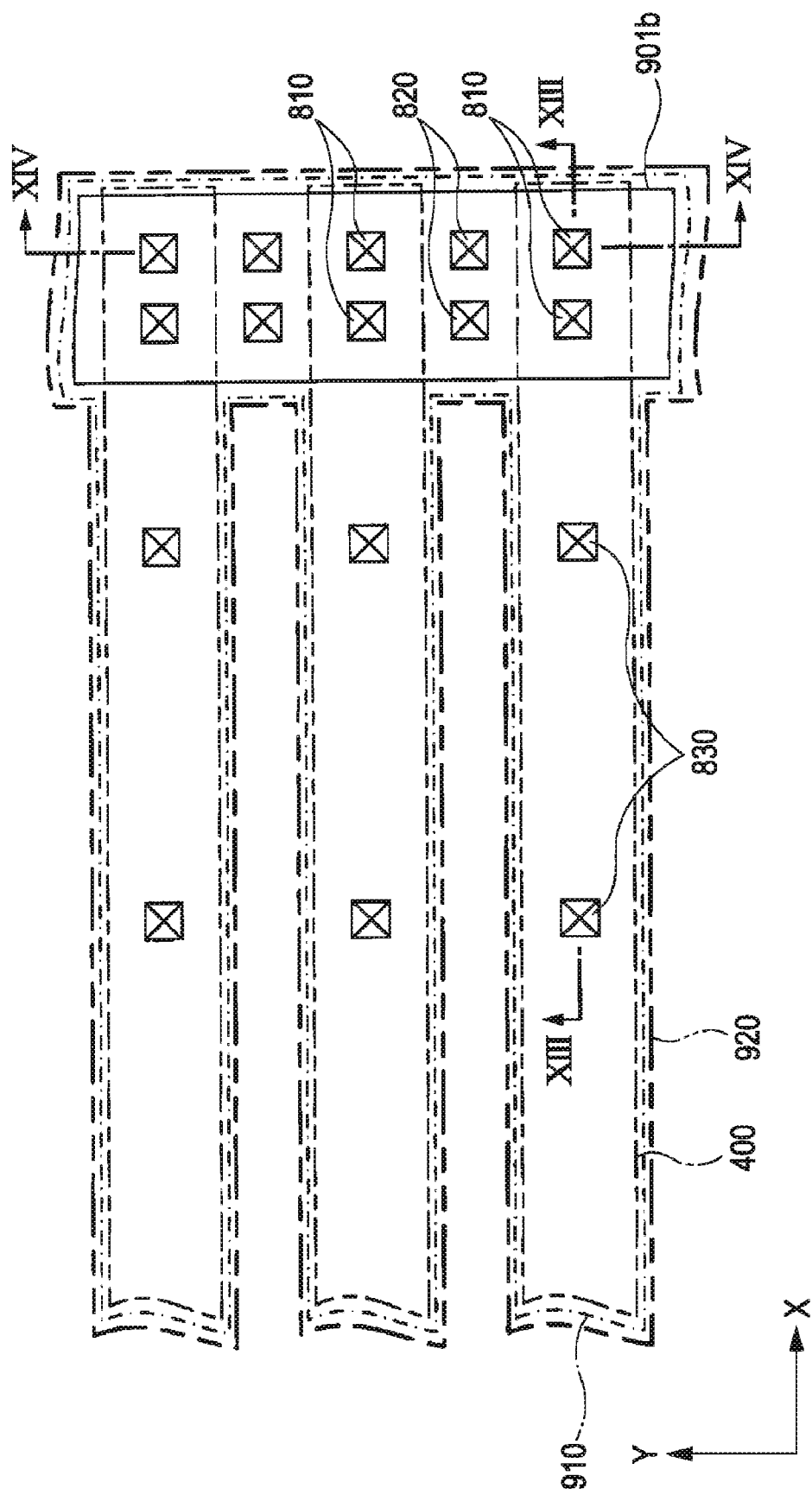
FIG. 12 is a partly expanded plane view of C2 in FIG. 11.
Figure 13:
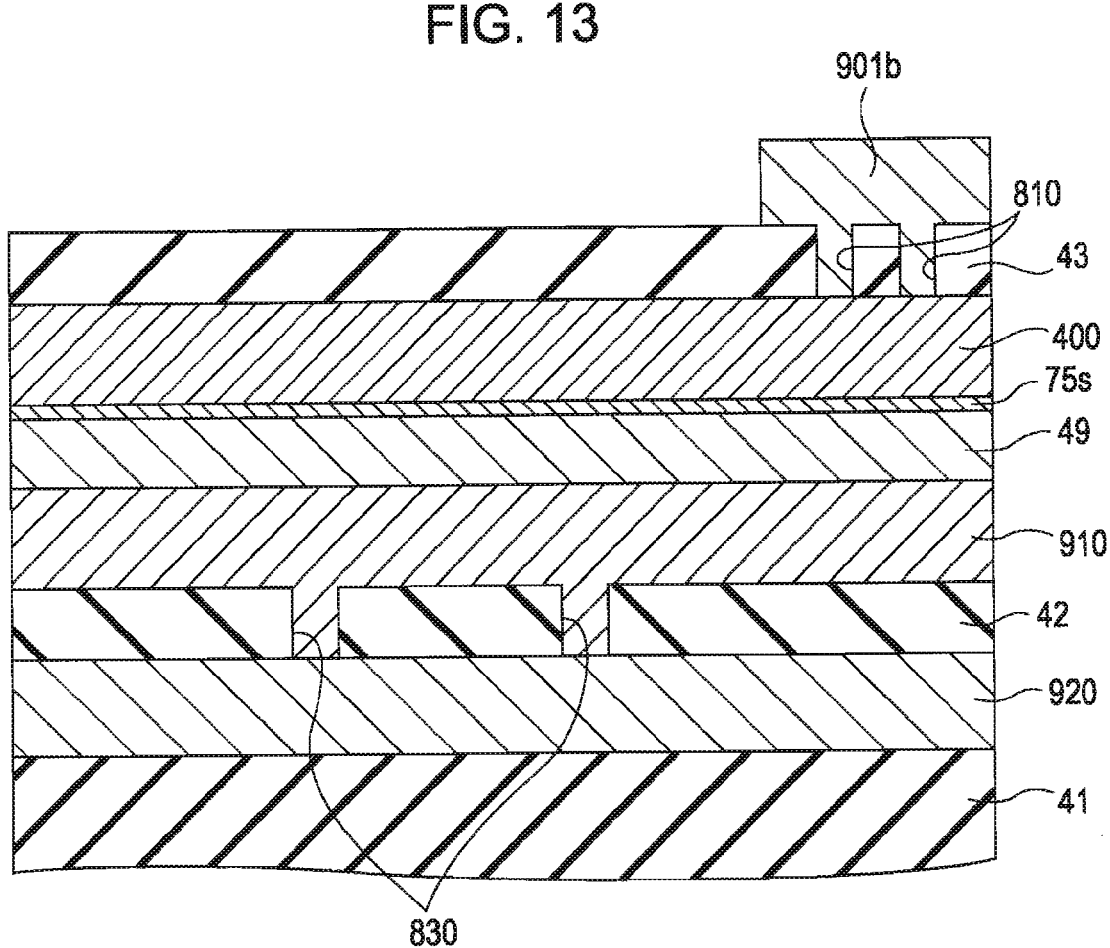
FIG. 13 is a cross-sectional view taken along the line E-E' in FIG. 12.
Figure 14:
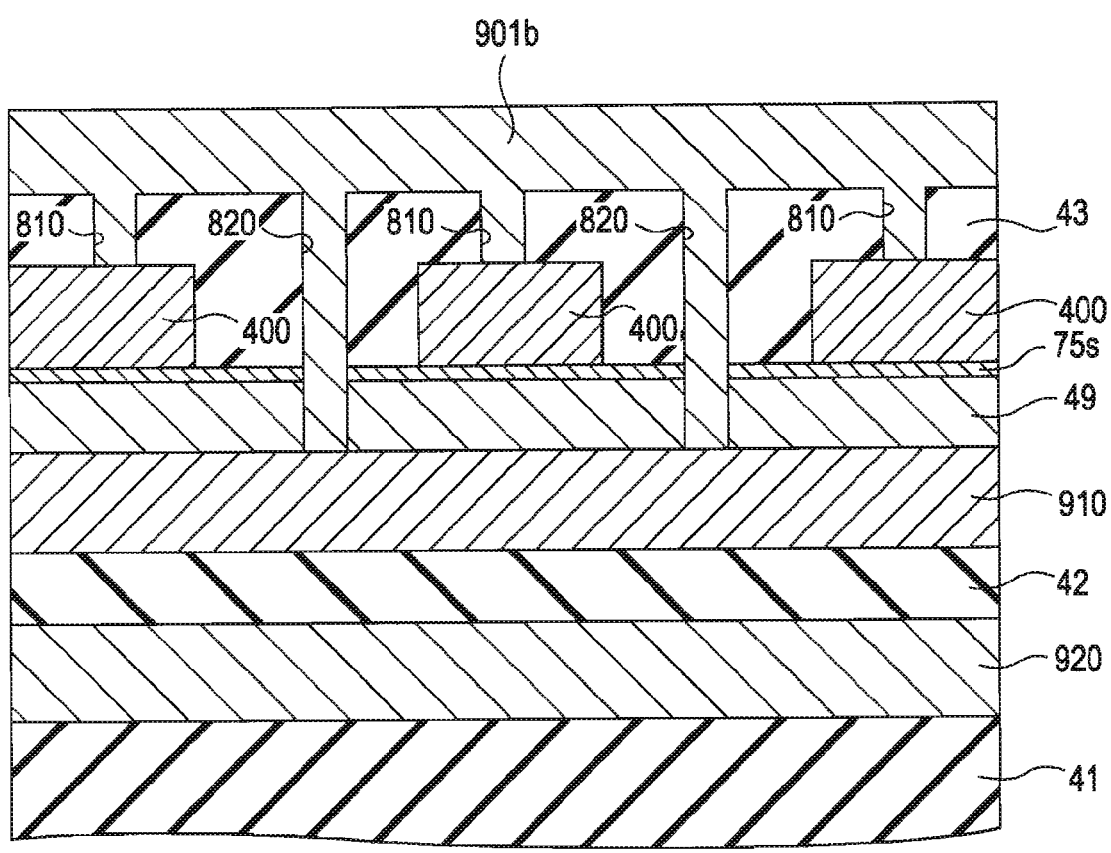
FIG. 14 is a cross-sectional view taken along the lone F-F' in FIG. 13.

Next, electrical connections of each of the storage lines and a corresponding one of the discharging resistors according to an aspect of the embodiment will be described with reference to the FIGS. 10 to 14. FIG. 10 is a plane view illustrating the frame of the TFT array substrate of the relay layer. FIG. 11 is a partly expanded plane view of C2 in FIG. 10. FIG. 12 is a partly expanded plane view of C2 in FIG. 11. FIG. 13 is a cross-sectional view taken along the line E-E' in FIG. 12. FIG. 14 is a cross-sectional view taken along the line F-F' in FIG. 13. In FIG. 10, the scan line driving circuit 104, the data line driving circuit 101, and the like are omitted.

In FIG. 10, the relay layers 901 are disposed in a seal area 52a1 of the right side, a seal area 52a2 of the left side, and a seal area 52a3 of the upper side on the image display area. That is, the relay layers 901 are disposed on the right, left, and exterior side of the image display area 10a along the Y axis direction and on the opposite side of the exterior circuit connecting terminal 102. The relay layers 901 constitute a relay layer 901a and a relay layer 901b in the seal areas 52a1, 52a2, and 52a3.

As described in FIGS. 4 and 5, each of the capacitor lines 400 is disposed along the horizontal and vertical direction (that is, the X axis and Y axis direction) in the image display area 10a in FIG. 11. Each of the capacitor lines 400 is extended from the interior of the image display area 10a along the X axis direction in the seal area 52a1. Each of the capacitor lines 400 is also extended from the interior of the image display area 10a along the X axis direction in the seal area 52a2. Further, each of the capacitor lines 400 is extended from the interior of the image display area 10a along the Y axis direction in the seal area 52a3.

The relay layer 901 (that is, the relay layer 901a and the relay layer 901b) is disposed along the Y axis in the seal area 52a1. The relay layer 901a and the relay layer 901b are electrically connected to each other with each of capacitor lines 400 and each of the contact holes 810 therebetween. Further, each of the contact holes 810 is an example of "a first contact hole" according to an aspect of the invention.

In FIG. 12, the electric optic device according to an aspect of the invention includes each of a first relay line 910 and a second relay line 920. Further, the first relay line 910 is an example "a second conductive film" according to an aspect of the invention and the second relay line 920 is an example of "a third conductive film" according to an aspect of the invention.

As shown in FIG. 13, the film of the first relay line 910 is formed of the same as that of the lower electrodes 71 described above with reference to FIG. 7. The first relay line 910 separates from each of the lower electrodes 71 to be formed.

As shown in FIG. 12, the first relay line 910 is formed so as to have an overlapped part of each of the capacitor line 400 and the relay layer 901b in the seal area 52a1 in a plane view of the TFT array substrate 10. That is, the first relay line 910 has two part overlapped with the relay layers 901a and 901b along the Y axis and a plurality of part overlapped to each of the capacitor lines 400 along the X axis.

As shown FIG. 13, the film of the second relay line 920 is formed of the same as that of the data line 6a described above with reference to FIG. 7. That is, the second relay line 920 is integrally formed and electrically connected to the potential line 99 of each of the counter electrodes. Accordingly, the second relay layer 920 is provided for the potential LCCOM of each of the counter electrodes, and the second relay layer 920 is electrically connected to the discharging resistor 700 with the potential line 99 of each of the counter electrodes therebetween.

As shown in FIG. 12, the second relay line 920 is formed so as to have an overlapped part of the capacitor line 400 and the relay layer 901b in the seal area 52a1 in a plane view of the TFT array substrate 10 as the same as the first relay line 910. That is, the first relay line 910 has two part overlapped with the relay layers 901a and 901b along the Y axis and a plurality of parts overlapped with each of the capacitor lines 400 along the X axis.

As shown FIG. 13, the film of the relay layer 901b is formed of the same as that of each of the data lines 6a described above with reference to FIG. 7, and the relay layer 901b is electrically connected the capacitor line 400 with the contact hole 810 formed to the third inter-layer insulating film 43 therebetween. That is, the relay layer 901 is formed (that is, the same type of a transparent conductive film) when the pixel electrode 9a is formed in the course of producing. The relay layer 901 separates from the pixel electrode 9a each other.

Further, as shown in FIG. 14 is electrically connected to the first relay line 910 with the contact hole 820 formed through the third inter-layer insulating 43, the extending section 75a of the dielectric film 75, and the inter-layer insulating 49 therebetween. That is, the capacitor line 400 is electrically connected the first relay line 910 with the relay layer 901b therebetween. The contact hole 820 is an example of "the second contact hole" according to an aspect of the invention.

As shown in FIG. 13, the first relay line 910 is electrically connected the first relay line 920 with the relay layer 830 formed to the inter-layer insulating film 42 therebetween. Accordingly, the capacitor line 400 is electrically connected the second relay line 920 with the relay layer 901b and the first relay line 910 therebetween. The capacitor line 400 is provided with the potential LCCOM of the counter electrode and electrically connected the discharging resistor 700 with the potential line 99 of the counter therebetween. Therefore, for example, the remaining charge in the capacitor line 400 may be removed after separating from the detecting devices.

In FIG. 14, according to an aspect of the embodiment, the relay layer 901 that is the same like describing above is provided. Accordingly, a photo-etching at the time of forming the contact hole 820 is performed in a state the third inter-layer insulating 43 exists in the extending section 75s of the dielectric film 75. That is, the photo-etching finishes when the inter-layer insulating film does not exist on the extending section 75a of the dielectric film 75 (namely, when the surface of the upper layer of the extending section 75a is exposed in air or ambient atmosphere). The photo-etching to form the contact hole is performed on the extending section 75a of the dielectric film 75, thereby preventing the dielectric film 75 constituting the storage capacity 70 connected to the pixel electrode 9a electrically from being deteriorated. Therefore, the degradation of pixel quality such as a reduction in contrast of the image display may be restrained or prevented.

As described above, the capacitor line 400 and the first relay line 910 are electrically connected by the relay layer 901. Accordingly, since the dielectric film 75 may be influenced badly, it is practically possible to make the resistance of the capacitor line 400 low, comparing the case that the dielectric film 75 of the lower side cannot be electrically connected rather than the capacity 400 and capacity film 75.

As described above, the capacitor line 400 may be electrically connected to the first relay line 910 with the relay layer 901 therebetween, thereby having a bad effect on the dielectric film 75. Accordingly, the capacity 400 has lower resistance when the dielectric film 75 is electrically connect to the conductive film of the lower layer than when the first conductive film is not electrically connected to conductive film of the lower layer.

The film of the exterior circuit connecting terminal 102 to connect the capacity 400 to the exterior circuit may be formed as the same as that of the first relay line 910 or the second relay line 920. Without forming the conductive film (that is, the same film as the capacity 400) that the exterior circuit connecting terminal 102 is disposed above the conduct film 75, the film of the capacitor line 400 may be formed as the same as that of the conductive film (the same film as the first relay line 910 or the second relay line 920) disposed below the conduct film 75 connected electrically. Namely, a plurality of the exterior circuit connecting terminals 102 may be uniformly formed as the same film as the first relay line 910 or the second relay line 920. When the etching is performed to form the plurality of the exterior circuit connecting terminals 102, the etching depth may be uniformed. Accordingly, the upset of the rubbing roll due to the etching-depth difference (that is, nap upset of a cross-martial of the rubbing roll) can be almost prevented and the rubbing may be performed uniformly. As a result, the rubbing scratch can be restrained or prevented in the image display.

As shown in FIG. 10, in the embodiment, the relay layer 901 is especially disposed in the seal area 52a. Therefore, the image display never be hindered or almost in the image display area 10a, and the capacitor line 400 and the first relay line 910 are electrically connected by the relay layer 901 without increasing the size of the TFT array substrate 10.

As shown in FIG. 13, each of the capacitor lines 400 according to the embodiment is formed of a structure of a redundancy line connected electrically to the second relay line 920 as well as the first relay line 910. Accordingly, a resistance of each of the capacitor lines 400 may be lower.

Method of Manufacturing

Next, a method of manufacturing a liquid crystal device according to the embodiment will be described with reference to FIGS. 15 to 19. FIGS. 15 to 19 are manufacturing end views illustrating a serial process of manufacturing the liquid crystal device according to the embodiment. Further, in FIGS. 15 to 19, the end view of each of the pixel switching TFTs for illustrated in FIG. 7, the end view of the relay layer 901 illustrated in FIG. 13, and the end view of the relay layer 901 illustrated in FIG. 14 are properly shown. It will be described that the first relay line 910 and the second relay line of the liquid crystal device are connected electrically to the relay layer 901, and the process of manufacturing each of the pixel sections will be also described.

Figure 15:
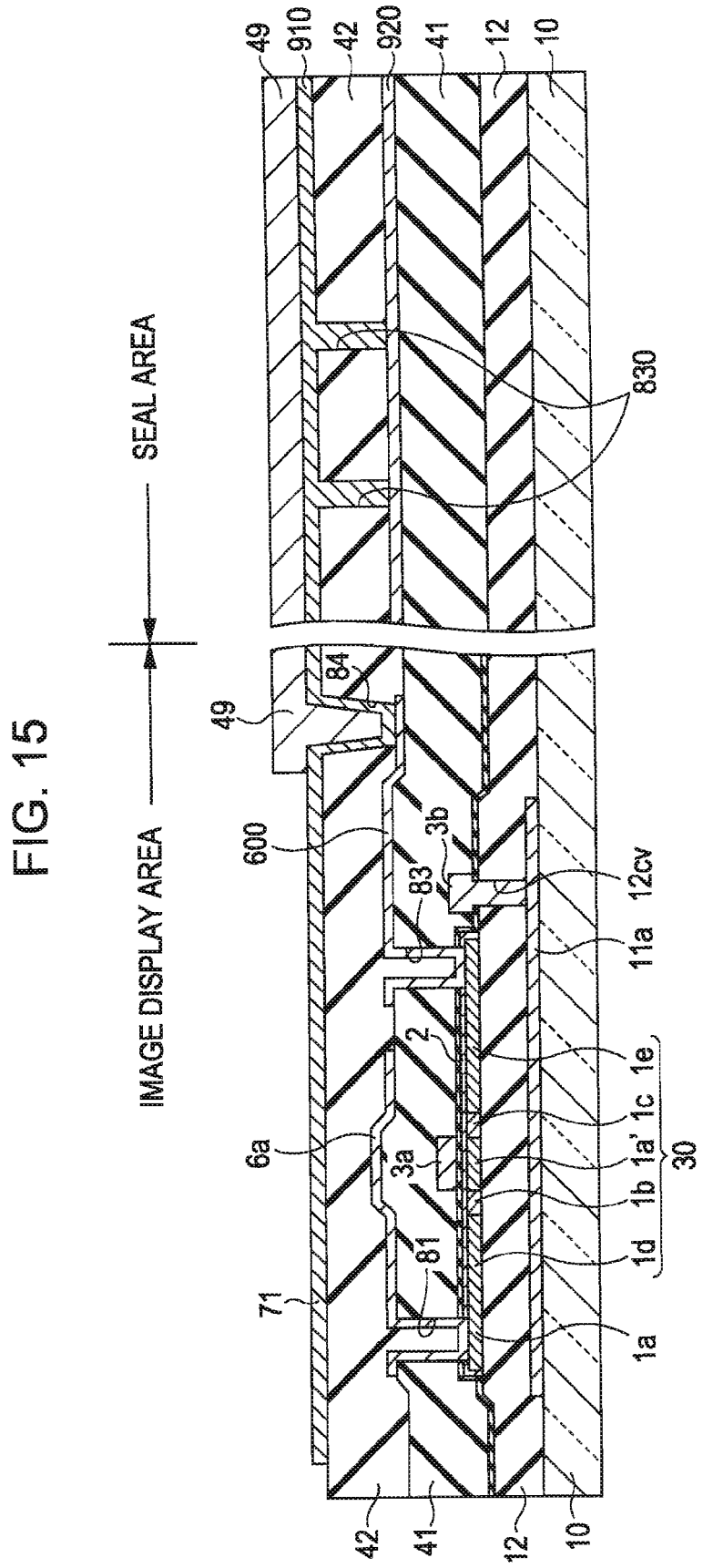
FIG. 15 is a producing end view illustrating a serial process of producing the liquid crystal device according to the first embodiment.

First, as shown in FIG. 15, in an image display area 10a, layers are formed from each of scan lines 11a to a first inter-layer insulating film 41 on the TFT array substrate 10, respectively. A grounding insulating film 12 and a first inter-layer insulating film 41 are formed on the entire TFT array substrate 10. Each of TFTs 30 is formed on an intersection area of a corresponding one of the scan lines 11a and a corresponding one of data lines 6a that is formed later. In each process, the used semiconductor-integration technology may be used. After the first inter-layer insulating film 41 is formed, the surface of the first inter-layer insulating film 41 may be flattened by the CMP process.

Each of discharging resistors 700 described above with reference to FIG. 9 is formed on the same layer as the semiconductor layer 1a in the process of forming each of the TFTs 30.

The etching is performed on a predetermined location of the surface of the first inter-layer insulating film 41, and each of contact holes 81 reaching the thickness of the high-concentration source area 1d and each of contact holes 83 reaching the thickness of the high-concentration drain area 1e are formed.

Next, a conductive light-shielding film is laminated in a predetermined pattern such that the film has, for example, 0.5 µm or so in thickness. In the image display area 10a, each of the data lines 6a and the relay layer 600 are formed, and the second relay line 920 is formed in the seal area 52a. Each of the data lines 6a is formed so as to partly cover the channel area 1a' of a corresponding one of the TFTs 30 and connected to the high-concentration source area 1d in a row with a corresponding one of the contact holes 81 therebetween. The relay layer 600 is connected to the high-concentration drain area 1e in a row with a corresponding one of the contact holes 83 therebetween. The second relay line 920 is integrally formed with the potential line 99 of a corresponding one of the counter electrodes and is electrically connected to a corresponding one of the discharging resistors 700.

Next, the second inter-layer insulating film is formed such that the film has, for example, 300 µm or so in thickness on the entire surface of the TFT array substrate 10. The second inter-layer insulating film 42 is formed, and then the surface of the second inter-layer insulating film 42 is flattened by the CMP process and the like. The etching is performed on a predetermined location of the surface of the first inter-layer insulating film 42, and each of contact holes 84 reaching the thickness of the relay layer 600 are formed, and each contact holes 830 reaching the thickness of the second relay line 920 are formed. Next, a conductive light-shielding film is laminated in a predetermined pattern such that the film has, for example, 0.5 µm or so in thickness. In the image display area 10a, each of the lower electrodes 71 is formed, and in the seal area 52a, the first relay line 910 is formed. Each of the lower electrodes 71 is formed so as to cover an area opposite to the channel area 1a' of a corresponding one of the TFTs 30 and connected to the relay layer 600 in a row with a corresponding one of the contact holes 84 therebetween.

Each of the first relay lines 910 is formed to partly overlap each of the second relay lines 920 in the plane view of the TFT array substrate 10 and is electrically connected to a corresponding one of the second relay lines 920 with a corresponding one of the contact holes 830 therebetween.

Next, an inter-layer insulating film 49 is laminated in a predetermined pattern on an area where each of the storage capacitors 70 on the TFT array substrate 10 is not formed such that the film has, for example, 0.4 µm or so in thickness.

Figure 16:
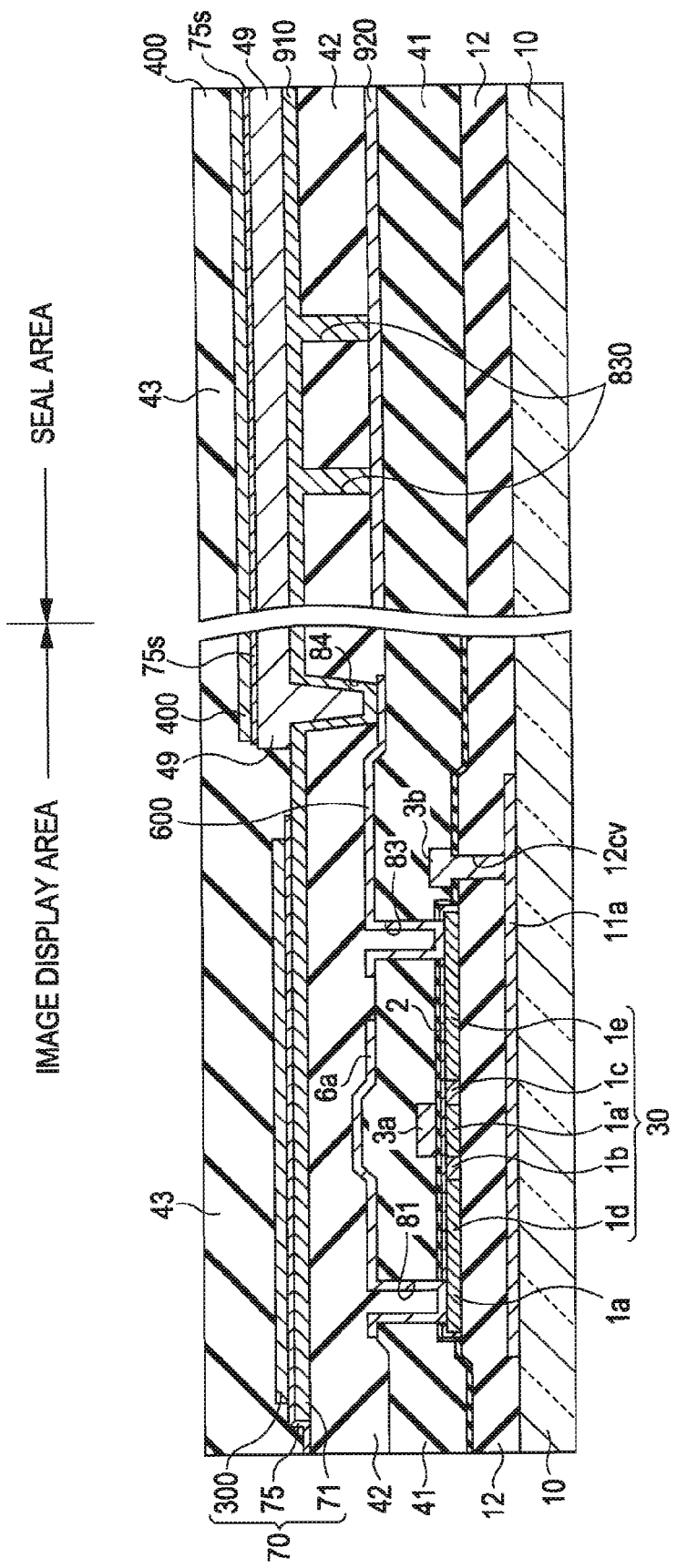
FIG. 16 is a producing end view illustrating a serial process of producing the liquid crystal device according to the first embodiment.
Figure 17:
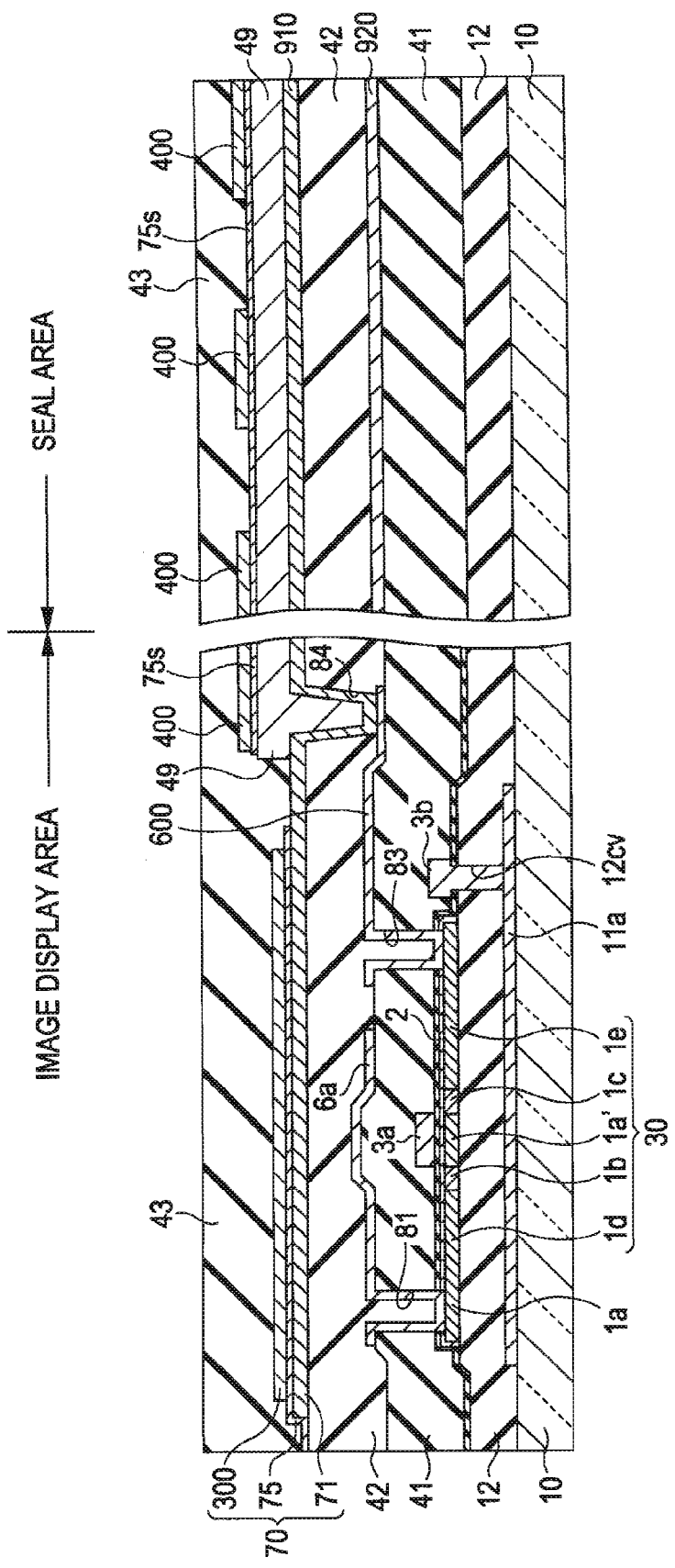
FIG. 17 is a producing end view illustrating a serial process of producing the liquid crystal device according to the first embodiment.

Next, as shown in FIGS. 16 and 17, the conductive film (that is, the plasmatic silicon nitride film according to the embodiment) is laminated in a predetermined pattern such that the film has, for example, 0.02 µm or so in thickness.

Each of the storage capacitors 70 is formed on the proper area, and each of the extending sections 75s of the dielectric film 75 is formed on the proper area (that is, the area where the inter-layer insulating film 49 is laminated). In the image display area 10a, a conductive light-shielding film is laminated on a predetermined area including the opposite area to the channel area 1a' such that the film has, for example, 0.5 µm or so in thickness. In order to provide the potential LCCOM of a corresponding one of the counter electrodes for a corresponding one of the capacity electrodes 300, each of the capacitor lines 400 is formed in a predetermined pattern (see FIGS. 6 and 11) in the image display area 10a and the seal area 52a such that the film has, for example, 0.5 µm or so in thickness. After the third inter-layer insulating film 43 is formed, the surface of the third inter-layer insulating film 43 may be flattened by the CMP process.

Figure 18:
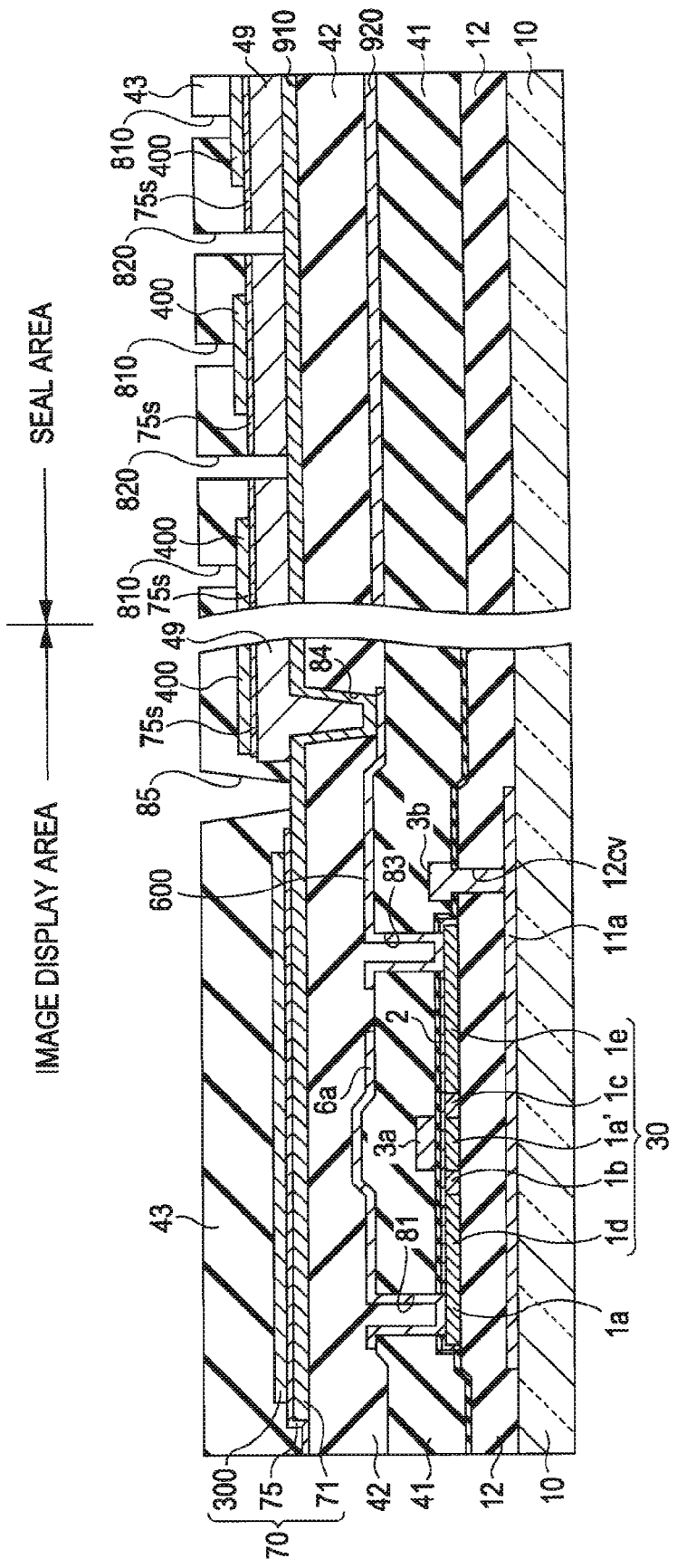
FIG. 18 is a producing end view illustrating a serial process of producing the liquid crystal device according to the first embodiment.
Figure 19:
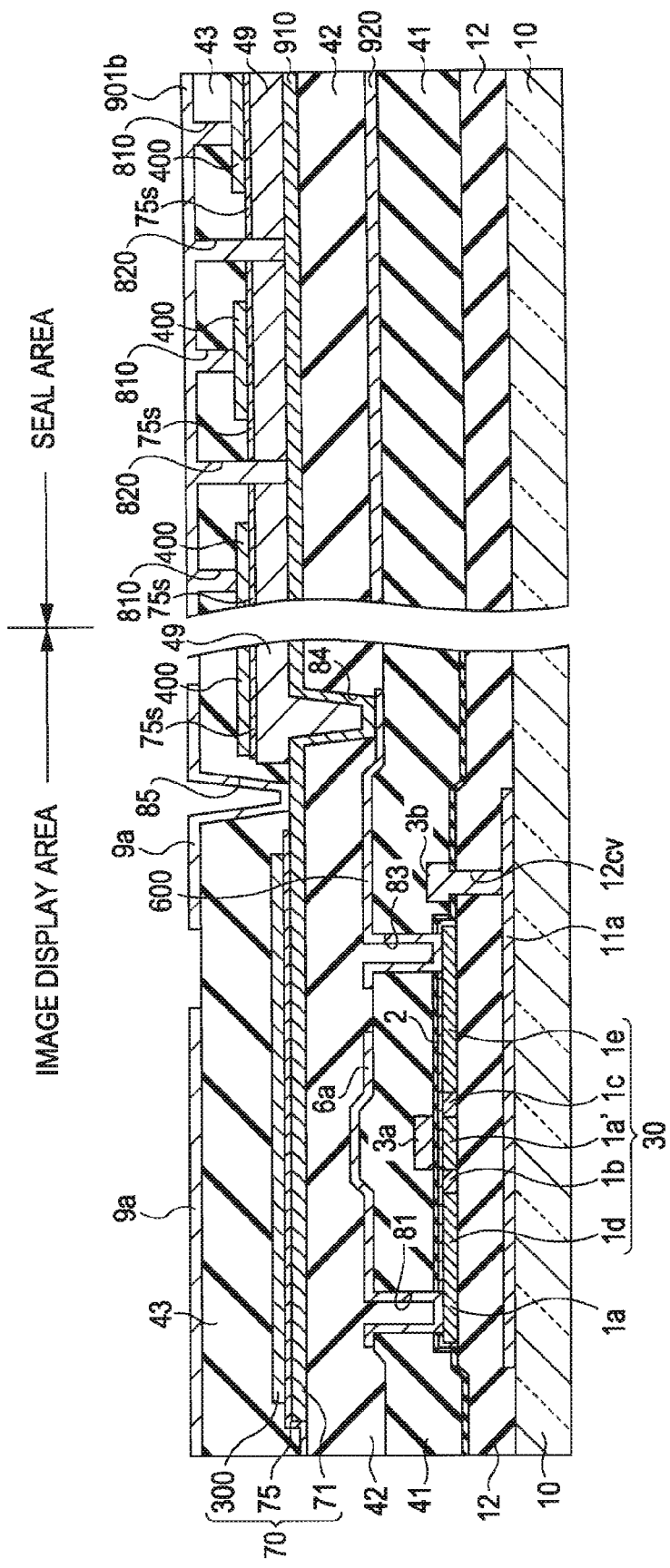
FIG. 19 is a producing end view illustrating a serial process of producing the liquid crystal device according to the first embodiment.

Next, as shown in FIG. 18, the etching is performed on a predetermined area of the surface of the third inter-layer insulating film 43. In the image display area 10a, each of the contact holes 85 reaching the thickness of the extending sections of a corresponding one of the lower electrodes 71 is formed, and in the seal area 52a, each of contact holes 810 reaching the thickness of a corresponding one of the capacitor lines 400 and a corresponding one of the contact holes 820 reaching the thickness of a corresponding one of the first relay lines 910 are formed. Each of the contact hole 820 is formed through the third inter-layer insulating film 43, the extending section 75s of the dielectric film 75, and the inter-layer insulating film 49. Accordingly, it may be limited or prevented that an etchant has a bad effect on the dielectric film 75. Since the capability in each of the storage capacitors of a corresponding one of the pixels may be prevented from being degraded, the degradation of pixel quality such as a reduction in contrast of the image display may be limited or prevented.

A conductive light-shielding film is laminated in a predetermined pattern such that the film has, for example, 0.5 μm or so in thickness. Each of the data lines 6a and the relay layer 600 are formed, in the image display area 10a and the second relay line 920 is formed in the seal area 52a. Each of the data lines 6a is formed so as to partly cover the channel area 1a' of a corresponding one of the TFTs 30 and connected to the high-concentration source area 1d in a row with a corresponding one of the contact holes 81 therebetween. The relay layer 600 is connected to the high-concentration drain area 1e in a row with a corresponding one of the contact holes 83 therebetween. Each of the second relay lines 920 is integrally formed with the potential line 99 of a corresponding one of the counter electrodes and is electrically connected to a corresponding one of the discharging resistors 700.

According to the method described above, the liquid crystal device may be manufactured according to the embodiment. In particular, since the film of the relay layer 901 is formed of that each of the pixel electrodes 9a, the etching that is performed on the dielectric film 75 is not required in the process that the extending section 75a of the dielectric film 75 is exposed. Accordingly, it is possible to conduct through the relay layer 901 and the dielectric film 75 of a corresponding one of the first relay lines 910 from the upper to lower direction. Without have a bad effect on the dielectric film 75, each of the capacitor lines 400 may be electrically connected to a corresponding one of the first relay lines 910 with the relay layer 901 therebetween.

Electric Apparatus

Next, a case of applying the liquid crystal device to an electric apparatus will be described. In this case, a projector using the liquid crystal device as a light valve will be described.

Figure 20:
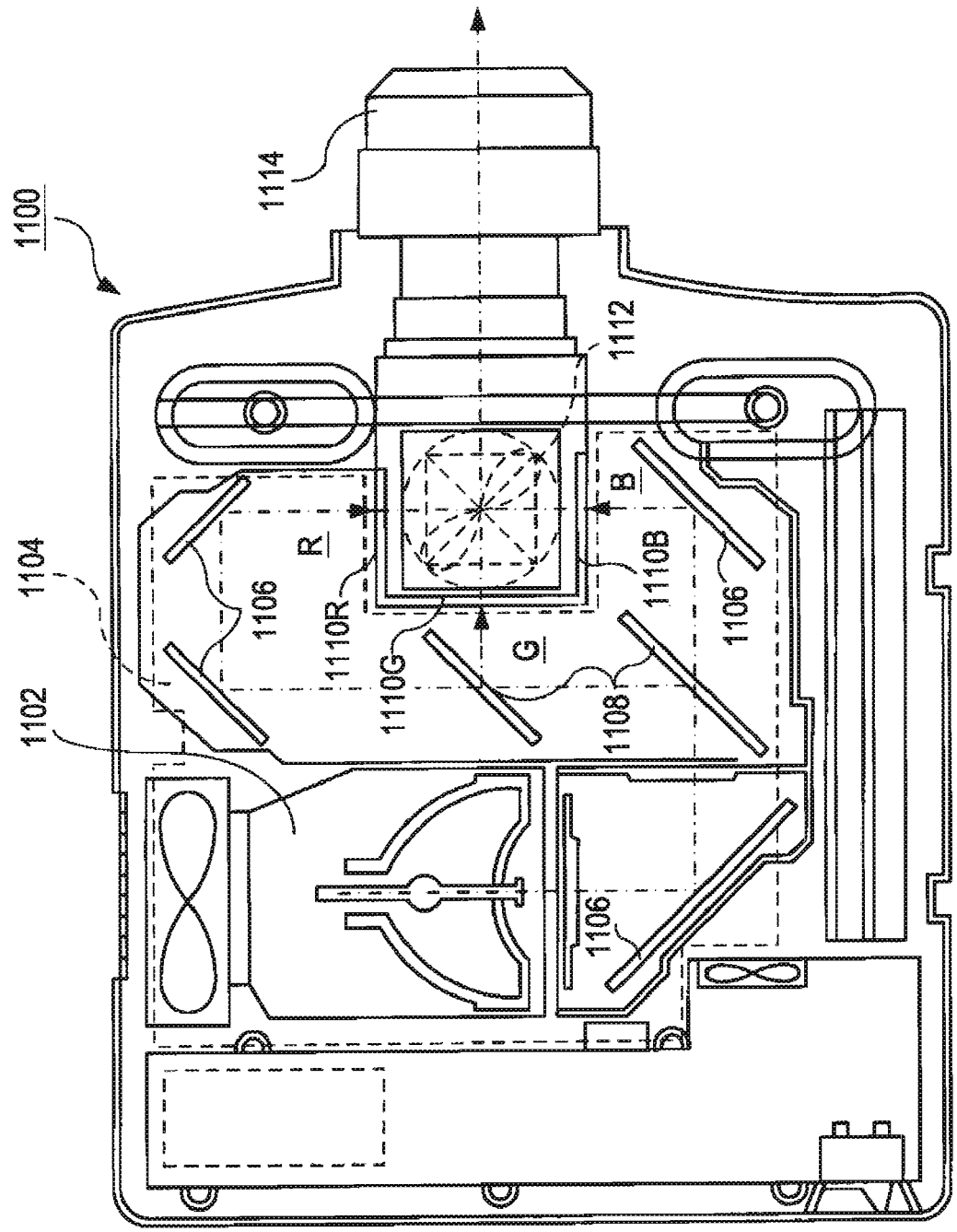
FIG. 20 is a plane view of illustrating a projector configuration, an example of an electronic apparatus applied with an electro-optical device.

FIG. 20 is a plane view illustrating an embodiment of the projector. As shown in FIG. 20, a lamp unit 1102 constituting a white light source such as a halogen lamp and the like in a projector 1100 is disposed. Transmitted light projected from the lamp unit 1102 separates into the three primary colors by 4 mirrors 1106 and 2 dichroic mirrors 1108 disposed in the light guide 1104, and then enter into liquid crystal panels 1110R, 1110B, and 1110G of the corresponding light valves.

A configuration of the liquid crystal panels 1110R, 11105B, and 1110G is the same as the liquid crystal device described above and the liquid crystal panels 1110R, 1110B, and 1110G are driven as the three primary colors R, G, B. In addition, light modulated by the liquid crystal panels enter to a dichroic prism 1112 from three directions. In the dichroic prism 1112, R and B light are reflected at 90°, and light goes straight. Images of each color are mixed, and enter to a screen and the like through a transmitting lens 1114.

In this case, considering the images by liquid crystal panels 1110R, 1110B, and 1110G, the images by the liquid crystal panel 1110G is required to reverse the liquid crystal panels 1110R and 111GB to the right and left.

In the liquid crystal panels 1110R, 1110B, and 1110G, light corresponding to R, G, and B enter by the dichroic mirrors 1108, thereby being not required to dispose a color filter.

Besides the electronic apparatus, the apparatus includes a personal computer, a mobile phone, a liquid crystal TV, a view finder type or monitor direct view-type video tape recorder, a car navigator, a pager, an electronic pocket book, a calculator, a word processor, a television phone, a POS terminal, a touch panel and the like. In addition, it goes without saying including an applicable apparatus to these types of the apparatus.

The entire disclosure of Japanese Patent Application Nos: 2006-004530, filed Jan. 12, 2006 and 2006-286027, filed Oct. 20, 2006 are expressly incorporated by reference herein.

What is claimed is:

1. An electro-optical device comprising:
a plurality of pixel electrodes;
storage capacitors which are provided below the plurality of pixel electrodes with an inter-layer insulating layer disposed therebetween and in which a lower electrode, a dielectric film, and an upper electrode are sequentially laminated;
an extending section extending from the dielectric film;
a first conductive film disposed above the extending section of the dielectric film;
a second conductive film disposed below the extending section of the dielectric film; and
a relay layer disposed above the first conductive film, at least formed of the same film as the plurality of the pixel electrodes, and electrically connecting the first conductive film to the second conductive film,
wherein the plurality of pixel electrodes and the storage capacitors are provided in a pixel area on a substrate, and the extending section, the first conductive film, tie second conductive film, and the relay layer are disposed in a peripheral area located around the pixel area.

2. The electro-optical device according to claim 1, wherein the relay layer is electrically connected to the first conductive film through a first contact hole formed through the inter-layer insulating film and is electrically connected to the second conductive film through a second contact hole formed through at least the inter-layer insulating film and the extending section.

3. The electro-optical device according to claim 1, wherein the relay layer is disposed in the peripheral area.

4. The electro-optical device according to claim 3, further comprising a counter substrate disposed opposite the substrate and a seal section bonding the substrate and the counter substrate,
wherein the relay layer is disposed in a seal area in which the seal section is formed in the peripheral area.

5. The electro-optical device according to claim 1, further comprising a third conductive film disposed below the second conductive film and electrically connected to the second conductive film.

6. The electro-optical device according to claim 1, further comprising a discharge resistor formed of at least a film having a resistance higher than that of the first conductive film and electrically connected to the second conductive film.

7. The electro-optical device according to claim 1, wherein the first conductive film constitutes a capacitor line electrically connected to the upper electrode.

8. The electro-optical device according to claim 1, further comprising a counter electrode opposite the plurality of pixel electrodes,
wherein the first conductive film forms a counter-electrode potential line supplying a predetermined potential to the counter electrode.

9. A method of manufacturing an electro-optical device including a plurality of pixel electrodes disposed in a pixel area, storage capacitors which are disposed below the plurality of pixel electrodes with an inter-layer insulating film therebetween and in which a lower electrode, a dielectric film, and an upper electrode are sequentially laminated, a first conductive film disposed on an extending section of the dielectric film, and a second conductive film disposed below the dielectric, on a substrate, the method comprising:

forming the second conductive film in an area where the second conductive film is formed;

sequentially laminating the lower electrode and the dielectric film in an area where the storage capacitor is formed so as to be disposed above the second conductive film;

forming the storage capacitor by laminating the upper electrode on the dielectric film and in an area where the storage capacitor is formed and forming the first conductive film on the extending section;

laminating the inter-layer insulating film above the storage capacitor, the first conductive film, and the dielectric film;

forming a first contact hole through the inter-layer insulating film so as to electrically connect a relay layer, which electrically connects the first conductive film to the second conductive film, to the inter-layer insulating film;

forming a second contact hole through the inter-layer insulating film and the extending section so as to electrically connect the relay layer to the second conductive film; and forming the plurality of the pixel electrodes in the pixel area and forming the relay layer out of the same film as the plurality of pixel electrodes.

10. An electronic apparatus comprising the electro-optical device according to claim 1.

* * * * *